US011621643B2

(12) United States Patent
Karakama et al.

(10) Patent No.: US 11,621,643 B2
(45) Date of Patent: Apr. 4, 2023

(54) BIDIRECTIONAL POWER CONVERSION

(71) Applicant: KABUSHIKI KAISHA YASKAWA DENKI, Kitakyushu (JP)

(72) Inventors: Hirotaka Karakama, Fukuoka (JP); Takahiro Uchino, Fukuoka (JP); Keisei Inoki, Fukuoka (JP); Masashiro Tanaka, Fukuoka (JP)

(*) Notice: Subject to any disclaimer, the term of this patent is extended or adjusted under 35 U.S.C. 154(b) by 0 days.

(21) Appl. No.: 17/460,331

(22) Filed: Aug. 30, 2021

(65) Prior Publication Data
US 2022/0069721 A1    Mar. 3, 2022

(30) Foreign Application Priority Data
Aug. 31, 2020  (JP) .............................. JP2020-146154

(51) Int. Cl.
*H02M 5/275* (2006.01)
*H02M 5/293* (2006.01)
(Continued)

(52) U.S. Cl.
CPC ....... *H02M 3/33584* (2013.01); *H02M 1/084* (2013.01); *H02M 5/275* (2013.01); *H02M 5/293* (2013.01)

(58) Field of Classification Search
CPC .......... H02P 27/05; H02P 27/16; H02M 5/22; H02M 5/275; H02M 5/293; H02M 5/297
See application file for complete search history.

(56) References Cited

U.S. PATENT DOCUMENTS

2014/0117917 A1* 5/2014 Takeda ................. H02M 5/16
  318/519
2014/0268970 A1* 9/2014 Tanaka ................. H02M 5/293
  363/163
(Continued)

FOREIGN PATENT DOCUMENTS

EP         2360827        8/2011
EP         2866338        4/2015
(Continued)

OTHER PUBLICATIONS

Lixiang Wei et al, "Analysis of Power Cycling Capability of IGBT Modules in a Conventional Matrix Converter", Industry Applications Society Annual Meeting, 2008. IAS '08. IEEE, IEEE, Piscataway, NJ, USA, Oct. 5, 2008, p. 1-p. 8.
(Continued)

*Primary Examiner* — Gary A Nash
(74) *Attorney, Agent, or Firm* — Soei Patent & Law Firm

(57) ABSTRACT

A power conversion apparatus includes: matrix converter circuitry configured to perform bidirectional power conversion between a primary side and a secondary side; and control circuitry configured to: select a first control mode in response to determining that a command-primary frequency difference between a command frequency and a primary side frequency of the matrix converter circuitry is above a predetermined threshold, wherein the first control mode includes causing a secondary side frequency of the matrix converter circuitry to follow the command frequency; select a second control mode in response to determining that the command-primary frequency difference is below the threshold, wherein the second control mode includes maintaining a primary-secondary phase difference between a secondary side phase and a primary side phase of the matrix converter circuitry within a predetermined target range; and control (Continued)

the matrix converter circuitry in accordance with a selection of the first control mode or the second control mode.

20 Claims, 14 Drawing Sheets

(51) Int. Cl.
*H02M 3/335* (2006.01)
*H02M 1/084* (2006.01)

(56) References Cited

U.S. PATENT DOCUMENTS

| | | | | |
|---|---|---|---|---|
| 2015/0115906 A1* | 4/2015 | Ebisu | ............. | H02M 5/293 |
| | | | | 323/217 |
| 2015/0130432 A1* | 5/2015 | Yamazaki | ............. | H02M 5/297 |
| | | | | 323/272 |
| 2015/0137779 A1* | 5/2015 | Takase | ............. | H02M 5/297 |
| | | | | 323/273 |
| 2015/0280597 A1* | 10/2015 | Takase | ............. | H02M 5/293 |
| | | | | 323/271 |
| 2016/0006389 A1* | 1/2016 | Takeda | ............. | H02M 1/42 |
| | | | | 318/400.26 |
| 2016/0094139 A1* | 3/2016 | Yamazaki | ............. | H02M 5/293 |
| | | | | 363/163 |
| 2016/0094140 A1 | 3/2016 | Yamazaki | | |

FOREIGN PATENT DOCUMENTS

| | | |
|---|---|---|
| JP | 2004-336848 | 11/2004 |
| JP | 2006-217772 | 8/2006 |
| JP | 2010-070361 | 4/2010 |
| JP | 2015-082949 | 4/2015 |
| JP | 2015-146688 | 8/2015 |
| JP | 2016-067169 | 4/2016 |

OTHER PUBLICATIONS

Casadei D et al, "Comparison between Back-to-Back and Matrix Converters Based on Thermal Stress of the Switches", Industrial Electronics, 2004 IEEE International Symposium On Ajaccio, France May 4-7, 2004, Piscataway, NJ, USA, IEEE, Piscataway, NJ USA, vol. 2, May 4, 2004, p. 1081-p. 1086.
Jun-Koo Kang et al, "Analysis and evaluation of bi-directional power switch losses for matrix converter drive", Conference Record of The 2002 IEEE Industry Applications Conference : 37th IAS Annual Meeting ; Oct. 13-18, 2002, Pittsburgh, Pennsylvania, USA; [Conference Record of the IEEE Industry Applications Conference. IAS Annual Meeting], IEEE Service CE, vol. 1, Oct. 13, 2002, p. 438-p. 443.
Extended Search Report in corresponding European Application No. 21193530.9, dated Jan. 28, 2022.
Extended Search Report in corresponding European Application No. 21193532.5, dated Jan. 28, 2022.
SOEI Patent and Law Firm, Statement of Related Matters, dated Sep. 17, 2021.

* cited by examiner

BIDIRECTIONAL POWER CONVERSION

CROSS-REFERENCE TO RELATED APPLICATIONS

This application is based upon and claims the benefit of priority from Japanese Patent Application No. 2020-146154, filed on Aug. 31, 2020, the entire contents of which are incorporated herein by reference.

BACKGROUND

Field

The present disclosure relates to a power conversion apparatus and a power conversion method.

Description of the Related Art

Japanese Unexamined Patent Application Publication No. 2015-82949 discloses a matrix converter in which, when the difference between the frequency of the output voltage from a power conversion unit to a load and the frequency of an AC power supply falls within a predetermined range, the power conversion unit performs a voltage increase control to increase the output voltage and a follow-up control to cause the phase of the output voltage to follow the voltage phase of the AC power supply, and, after finishing these controls, the power conversion unit connects the AC power supply directly to the load.

SUMMARY

Disclosed herein is a power converter for matrix converter circuitry. The power conversion apparatus according to an aspect of the disclosure may include: matrix converter circuitry configured to perform bidirectional power conversion between a primary side and a secondary side; and control circuitry configured to: select a first control mode in response to determining that a command-primary frequency difference between a command frequency and a primary side frequency of the matrix converter circuitry is above a predetermined threshold, wherein the first control mode includes causing a secondary side frequency of the matrix converter circuitry to follow the command frequency; select a second control mode in response to determining that the command-primary frequency difference is below the threshold, wherein the second control mode includes maintaining a primary-secondary phase difference between a secondary side phase and a primary side phase of the matrix converter circuitry within a predetermined target range; and control the matrix converter circuitry in accordance with a selection of the first control mode or the second control mode.

A matrix converter circuitry may be configured to perform bidirectional power conversion between primary side power and secondary side power. A power conversion method disclosed herein may include: selecting a first control mode in response to determining that a command-primary frequency difference between a command frequency and a primary side frequency of the matrix converter circuitry is above a predetermined threshold, wherein the first control mode includes causing a secondary side frequency of a matrix converter circuitry to follow the command frequency; selecting a second control mode in response to determining that the command-primary frequency difference is below the threshold, wherein the second control mode includes maintaining a primary-secondary phase difference between a secondary side phase and a primary side phase of the matrix converter circuitry within a predetermined target range; and controlling the matrix converter circuitry in accordance with a selection of the first control mode or the second control mode.

DETAILED DESCRIPTION

In the following description, with reference to the drawings, the same reference numbers are assigned to the same components or to similar components having the same function, and overlapping description is omitted.

Power Conversion Apparatus

Figure 1:
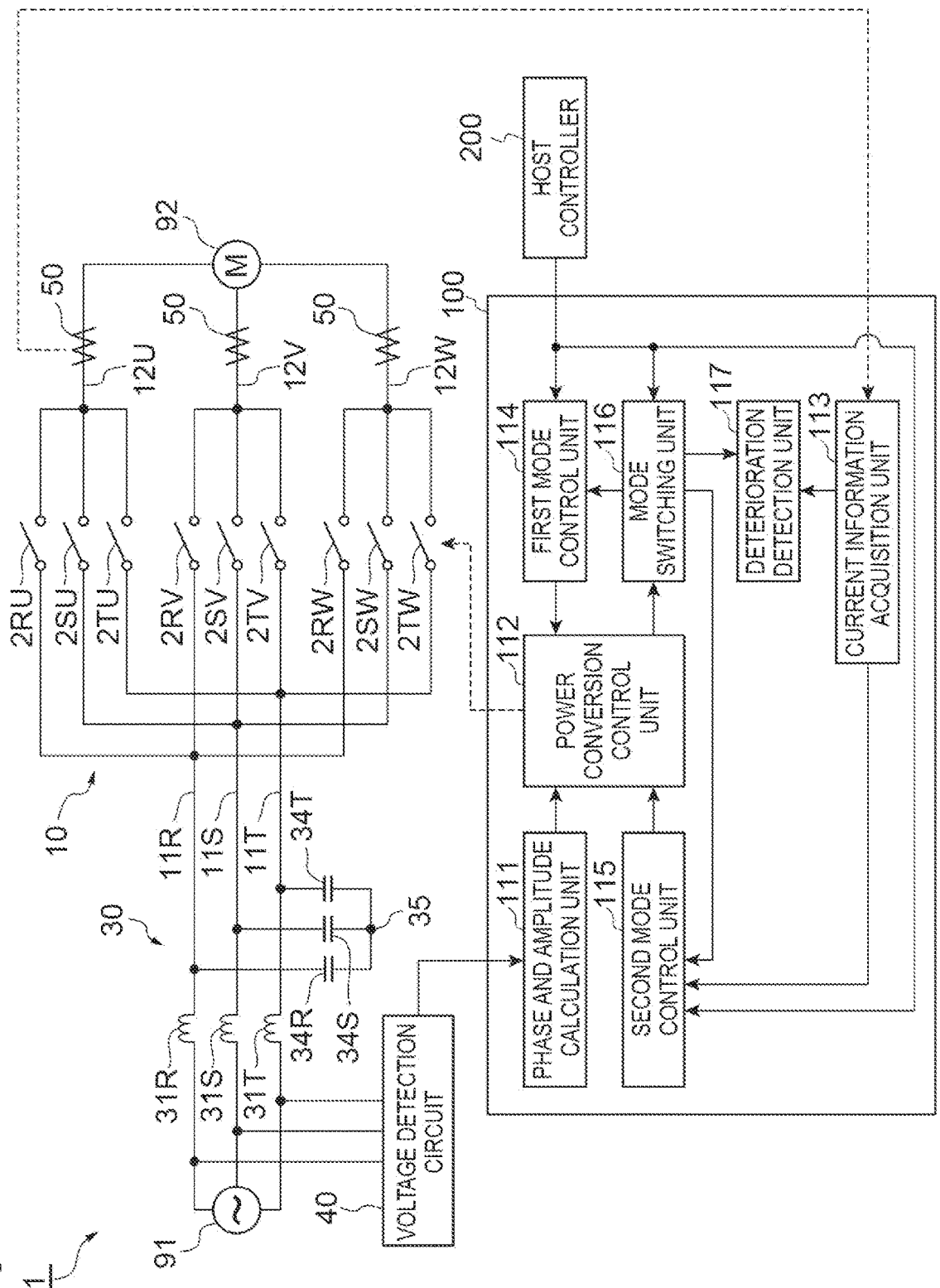
FIG. 1 is a schematic diagram illustrating the configuration of an example power conversion apparatus.

A power conversion apparatus 1 illustrated in FIG. 1 is a device that performs bidirectional power conversion between a primary side and a secondary side. For example, the power conversion apparatus 1 converts the primary side power supplied from a power supply 91 into the secondary side power and supplies the secondary side power to an electric device 92. The power conversion apparatus 1 converts the secondary side power (regenerative power) generated by the electric device 92 into the primary side power and supplies the primary side power to the power supply 91.

The primary side power and the secondary side power may be single-phase AC power or three phase AC power. The primary side power and the secondary side power may be DC power. Hereinafter, a case where the primary side power and the secondary side power are both three phase AC power will be described. For example, the primary side power includes three phases of an R phase, an S phase, and a T phase, and the secondary side power includes three phases of a U phase, a V phase, and a W phase.

The power conversion apparatus 1 includes matrix converter circuitry 10, a filter 30, a voltage detection circuit 40, a current sensor 50, and a control circuitry 100. Hereinafter, the configuration of each element will be described in detail.

Matrix Converter Circuitry

The matrix converter circuitry 10 has a plurality of switching elements, and performs bidirectional power conversion between the primary side power and the secondary side power without going through a DC conversion process. For example, the matrix converter circuitry 10 has power lines 11R, 11S, 11T on the primary side, power lines 12U, 12V, 12W on the secondary side, and nine sets of bidirectional switches 2RU, 2SU, 2TU, 2RV, 2SV, 2TV, 2RW, 2SW, 2TW. A power line 11R is an R phase power transmission line, a power line 11S is an S phase power transmission line, and a power line 11T is a T phase power transmission line. A power line 12U is a U phase power transmission line, a power line 12V is a V phase power transmission line, and a power line 12W is a W phase power transmission line.

Each of the bidirectional switches 2RU, 2SU, 2TU, 2RV, 2SV, 2TV, 2RW, 2SW, 2TW switches among 3 states: a state in which a current flows from the primary side to the secondary side, a state in which a current flows from the secondary side to the primary side, and a state in which no current flows.

A bidirectional switch 2RU is interposed between the power line 11R and the power line 12U, and switches between a first ON state in which a current flows from the power line 11R to the power line 12U, a second ON state in which a current flows from the power line 12U to the power line 11R, and a bidirectional OFF state in which no current flows. A bidirectional switch 2SU is interposed between the power line 11S and the power line 12U, and switches between a first ON state in which a current flows from the power line 11S to the power line 12U, a second ON state in which a current flows from the power line 12U to the power line 11S, and a bidirectional OFF state in which no current flows. A bidirectional switch 2TU is interposed between the power line 11T and the power line 12U, and switches between a first ON state in which a current flows from the power line 11T to the power line 12U, a second ON state in which a current flows from the power line 12U to the power line 11T, and a bidirectional OFF state in which no current flows.

A bidirectional switch 2RV is interposed between the power line 11R and the power line 12V, and switches between a first ON state in which a current flows from the power line 11R to the power line 12V, a second ON state in which a current flows from the power line 12V to the power line 11R, and a bidirectional OFF state in which no current flows. A bidirectional switch 2SV is interposed between the power line 11S and the power line 12V, and switches between a first ON state in which a current flows from the power line 11S to the power line 12V, a second ON state in which a current flows from the power line 12V to the power line 11S, and a bidirectional OFF state in which no current flows. A bidirectional switch 2TV is interposed between the power line 11T and the power line 12V, and switches between a first ON state in which a current flows from the power line 11T to the power line 12V, a second ON state in which a current flows from the power line 12V to the power line 11T, and a bidirectional OFF state in which no current flows.

A bidirectional switch 2RW is interposed between the power line 11R and the power line 12W, and switches between a first ON state in which a current flows from the power line 11R to the power line 12W, a second ON state in which a current flows from the power line 12W to the power line 11R, and a bidirectional OFF state in which no current flows. A bidirectional switch 2SW is interposed between the power line 11S and the power line 12W, and switches between a first ON state in which a current flows from the power line 11S to the power line 12W, a second ON state in which a current flows from the power line 12W to the power line 11S, and a bidirectional OFF state in which no current flows. A bidirectional switch 2TW is interposed between the power line 11T and the power line 12W, and switches between a first ON state in which a current flows from the power line 11T to the power line 12W, a second ON state in which a current flows from the power line 12W to the power line 11T, and a bidirectional OFF state in which no current flows.

Figure 2:
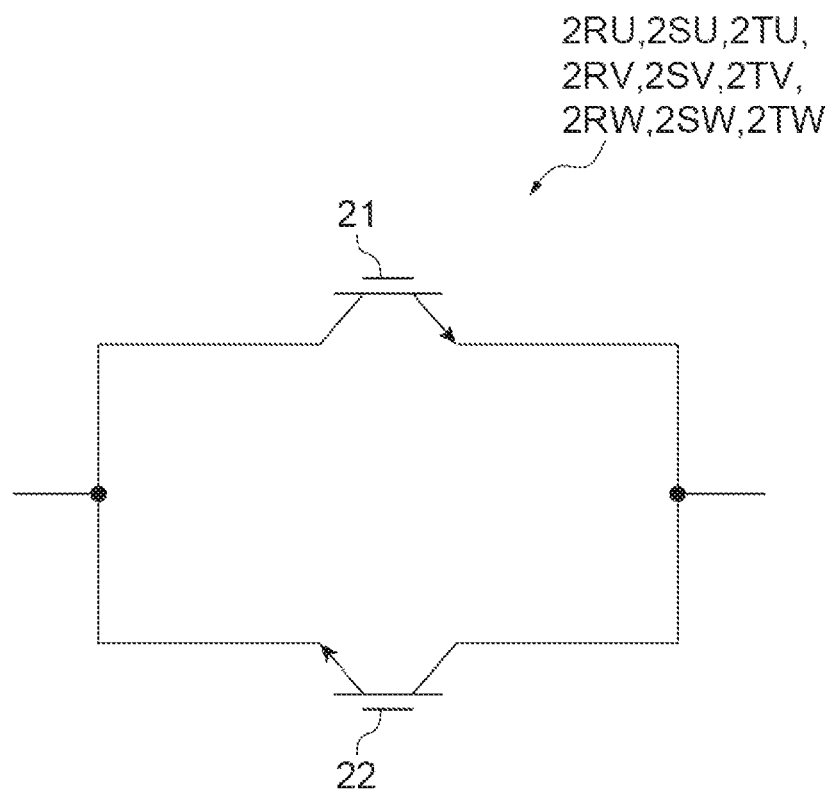
FIG. 2 is a schematic diagram illustrating an example of a bidirectional switch.

As illustrated in FIG. 2, each of the bidirectional switches 2RU, 2SU, 2TU, 2RV, 2SV, 2TV, 2RW, 2SW, 2TW comprises two switches 21 and 22. In an ON state, the switch 21 passes a current from the primary side to the secondary side without passing a current from the secondary side to the primary side. In an ON state, the switch 22 passes a current from the secondary side to the primary side without passing a current from the primary side to the secondary side. Further, the switches 21, 22 are switches having a reverse blocking capability capable of maintaining the OFF state in the OFF state with respect to the voltage application in the direction opposite to the flow direction of the ON state.

The bidirectional switches 2RU, 2SU, 2TU, 2RV, 2SV, 2TV, 2RW, 2SW, 2TW are, for example, in the first on state by turning on the switch 21 and turning off the switch 22, the second on state by turning off the switch 21 and turning on the switch 22, and the bidirectional off state by turning off the switches 21 and 22. In FIG. 2, the bidirectional switches 2RU, 2SU, 2TU, 2RV, 2SV, 2TV, 2RW, 2SW, 2TW may include diodes each of which is connected in series with each of the switches 2 1and 22 having no reverse blocking capability. In some examples, a connection point between the switch 21 and the diode may be connected to a connection point between the switch 22 and the diode.

Returning to FIG. 1, the filter 30 reduces harmonic components of the voltage or current on its primary side. For example, the filter 30 includes inductors 31R, 31S, 31T and capacitors 34R, 34S, 34T. The inductors 31R, 31S, 31T are respectively provided in the power lines 11R, 11S, 11T. The capacitor 34R is provided between the power line 11R and a neutral point 35 on the secondary side of the inductor 31R (between the inductor 31R and the bidirectional switches 2RU, 2RV, 2RW). The capacitor 34S is provided between the power line 11S and the neutral point 35 on the second order side of the inductor 31S (between the inductor 31S and the bidirectional switches 2SU, 2SV, 2SW). The capacitor 34T is provided between the power line 11T and the neutral point 35 on the second order side of the inductor 31T (between the inductor 31T and the bidirectional switches 2TU, 2TV, 2TW). As described above, since the filter 30 is provided between the power supply 91 and the matrix converter circuitry 10, the harmonic components of the voltage or current of the power supply 91 are reduced by the filter 30.

The voltage detection circuit 40 (a voltage sensor) detects an instantaneous value of the voltage on the primary side of the matrix converter circuitry 10. For example, the voltage detection circuit 40 detects an instantaneous value of the phase voltage of each primary side of the filter 30. The voltage detection circuit 40 may detect an instantaneous value of a phase voltage on the secondary side of the filter 30. Hereinafter, the voltage on the primary side of the matrix converter circuitry 10 is referred to as "a primary side voltage". The current on the primary side of the matrix converter circuitry 10 is referred to as "a primary side current".

The current sensor 50 detects the instantaneous value of the current on the secondary side of the matrix converter circuitry 10 (the current flowing between the matrix converter circuitry 10 and the electric device 92). For example, the current sensor 50 detects the instantaneous value of the current in the power lines 12U, 12V, 12W. Hereinafter, the current on the secondary side of the matrix converter circuitry 10 is referred to as "a secondary side current". The voltage on the secondary side of the matrix converter circuitry 10 is referred to as "a secondary side voltage". The current sensor 50 may be configured to detect the secondary side current value of all phases of the power lines 12U, 12V, 12W, or may be configured to detect the secondary side current value of any two phases of the power lines 12U, 12V, 12W. As long as the zero phase current is not generated, the sum of a current values of the U phase, the V phase, and the W phase is zero, and thus information of the secondary side current values of all phases is obtained even when the secondary side current value of two phases is detected.

Control Circuitry

The control circuitry 100 controls the matrix converter circuitry 10 to perform power conversion between the primary side power and the secondary side power. If a state in which a secondary side phase and a primary side phase are aligned is maintained in the matrix converter circuitry 10, current is concentrated on any of the switching elements of the matrix converter circuitry 10, and heat generation in the switching element increases. The state in which the secondary side phase and the primary side phase are aligned corresponds to a state in which there is no difference between the primary side phase and the secondary side phase. In addition, as a secondary side frequency approaches a primary side frequency, this phenomenon repeatedly occurs at a frequency of a difference between the secondary side frequency and the primary side frequency.

On the other hand, the control circuitry 100 is configured to: select a first control mode in response to determining that a command-primary frequency difference between a command frequency and a primary side frequency of the matrix converter circuitry 10 is above a predetermined threshold, wherein the first control mode includes causing a secondary side frequency of the matrix converter circuitry 10 to follow the command frequency; select a second control mode in response to determining that the command-primary frequency difference is below the threshold, wherein the second control mode includes maintaining a primary-secondary phase difference between a secondary side phase and a primary side phase of the matrix converter circuitry 10 within a predetermined target range; and control the matrix converter circuitry 10 in accordance with a selection of the first control mode or the second control mode. For example, the control circuitry 100 is configured to perform: a first mode control that includes causing a secondary side frequency of a matrix converter circuitry 10 to follow a command frequency by the matrix converter circuitry 10 performing bidirectional power conversion between primary side power and secondary side power; a second mode control that includes maintaining, by the matrix converter circuitry 10, a difference between a secondary side phase and a primary side phase of the matrix converter circuitry 10 at odd multiples of 60°±30°; and a mode switching that includes switching the first mode control and the second mode control so that the first mode control is performed if the command-primary frequency difference is above the threshold, and the second mode control is performed if the command-primary frequency difference is below the threshold. As a result, a state in which the secondary side phase and the primary side phase are aligned is avoided, and thus heat generation of the switching element is suppressed. It should be noted that the difference falling below a predetermined threshold means that the magnitude (absolute value) of the difference falls below the predetermined threshold regardless of whether the difference is a positive value or a negative value. Similarly, the difference exceeding the predetermined threshold means that the magnitude of the difference exceeds the predetermined threshold. The same applies to the following description.

For example, the control circuitry 100 has a phase/amplitude calculation unit 111, a power conversion control unit 112, a current information acquisition unit 113, a first mode control unit 114, a second mode control unit 115, a mode switching unit 116, and a deterioration detection unit 117 as a functional configuration (hereinafter referred to as "a functional block").

The phase/amplitude calculation unit 111 calculates the phase, the oscillation amplitude and the frequency of the primary side voltage based on the phase voltage of the power lines 11R, 11S, 11T obtained by the voltage detection circuit 40. Hereinafter, the calculation results of the phase, the oscillation amplitude, and the frequency are referred to as "information of the primary side voltage".

The power conversion control unit 112 switches ON/OFF of the bidirectional switches 2RU, 2SU, 2TU, 2RV, 2SV, 2TV, 2RW, 2SW, 2TW in conjunction with a carrier wave so as to output an AC voltage or an AC current corresponding to the control command to the secondary side of the matrix converter circuitry 10. For example, based on the primary side voltage information and the voltage command, the power conversion control unit 112 switches ON/OFF of the bidirectional switches 2RU, 2SU, 2TU, 2RV, 2SV, 2TV, 2RW, 2SW, 2TW in conjunction with the carrier wave so as to output the secondary side voltage corresponding to the voltage command.

More particularly, the power conversion control unit 112 sequentially selects each of the R phase, the S phase and the T phase as a reference phase based on the primary side voltage information, and controls the matrix converter circuitry 10 to output the secondary side voltage corresponding to the voltage command according to the potential differences between the reference phase and the other two phases. For example, the power conversion control unit 112 repeats, at the frequency of the primary side voltage, setting the R phase as a positive reference phase in a first section in which the voltage of the R phase is maximum, setting the T phase as a negative reference phase in a second section in which the voltage of the T phase is minimum, setting the S phase as the positive reference phase in a third section in which the voltage of the S phase is maximum, setting the R phase as the negative reference phase in a fourth section in which the voltage of the R phase is minimum, setting the T phase as the positive reference phase in a fifth section, and setting the S phase as the negative reference phase in a sixth section.

The power conversion control unit 112 maintains a state in which the reference phase is connected to the secondary side and at the same time, switches ON/OFF between the other two phases and the secondary side. For example, in the first section, the power conversion control unit 112 switches bidirectional switches 2SU, 2TU, 2SV, 2TV, 2SW, 2TW on and off while keeping any of the bidirectional switches 2RU, 2RV, 2RW on. In the second section, the power conversion control unit 112 switches bidirectional switches 2RU, 2TU, 2RV, 2TV, 2RW, 2TW on and off while keeping any of the bidirectional switches 2SU, 2SV, 2SW on. In the third section, the power conversion control unit 112 switches bidirectional switches 2RU, 2SU, 2RV, 2SV, 2RW, 2SW on and off while keeping any of the bidirectional switches 2TU, 2TV, 2TW on. In the fourth section, the power conversion control unit 112 switches the bidirectional switches 2SU, 2TU, 2SV, 2TV, 2SW, 2TW on and off while keeping any of the bidirectional switches 2RU, 2RV, 2RW on. In the fifth section, the power conversion control unit 112 switches the bidirectional switches 2RU, 2TU, 2RV, 2TV, 2RW, 2TW on and off while keeping any of the bidirectional switches 2SU, 2SV, 2SW on. In the sixth section, the power conversion control unit 112 switches the bidirectional switches 2RU, 2SU, 2RV, 2SV, 2RW, 2SW on and off while keeping any of the bidirectional switches 2TU, 2TV, 2TW on. The length (phase angle) of each of the first section to the sixth section is ⅙ of a period (60°). Hereinafter, a period in which any one of the R phase, the S phase, and the T phase is the positive reference phase (the first section, the third section, and the fifth section) is referred to as a positive reference period, and a period in which any one of the R phase, the S phase, and the T phase is the negative reference phase (the second section, the fourth section, and the sixth section) is referred to as a negative reference period.

The power conversion control unit 112 usually controls the phase of the primary side current so that the primary side power factor is one in order to maximize the utilization of the primary side voltage to the secondary side voltage. The power conversion control unit 112 may adjust the power factor on the primary side by shifting the first section to the sixth section within a range in which the voltage of the R phase becomes a positive peak value in the first section, the voltage of the T phase becomes a negative peak value in the second section, the voltage of the S phase becomes the positive peak value in the third section, the voltage of the R phase becomes the negative peak value in the fourth section, and the voltage of the S phase becomes the negative peak value in the sixth section. For example, the power conversion control unit 112 shifts the center phases of the first section, the third section, and the fifth section within a range of more than −30° and less than 30° with respect to the phase in which the voltages of the R phase, the S phase, and the T phase become the positive peak value. In addition, the power conversion control unit 112 shifts the center phases of the second section, the fourth section, and the sixth section within a range in which the voltages of the R phase, the S phase, and the T phase are greater than −30° and less than 30° with respect to the negative peak value. Hereinafter, the center phases of the first section, the third section, and the fifth section are referred to as a positive reference phase. The center phases of the second section, the fourth section, and the sixth section are referred to as a negative reference phase. A phase in which the voltages of the R phase, the S phase, and the T phase become the positive peak value is referred to as "a primary side positive peak phase". A phase in which the voltages of the R phase, the S phase, and the T phase become the negative peak value is referred to as "a primary side negative peak phase".

The voltage command includes an amplitude command value and a phase command value. The amplitude command value is a command value for the oscillation amplitude of the secondary side voltage. A phase command value is a command value for the phase of the secondary side voltage. As an example, the amplitude command value corresponds to the magnitude of a voltage command vector in a fixed coordinate system, and the phase command value corresponds to the rotation angle of the voltage command vector in the fixed coordinate system. The fixed coordinate system is a coordinate system fixed to a stator of the electric device 92. Examples of the fixed coordinate system include an αβ coordinate system having an α axis and a β axis orthogonal to each other as coordinate axes.

The power conversion control unit 112 obtains the amplitude command value and the phase command value, and controls the matrix converter circuitry 10 to output the secondary side voltage having oscillation amplitude and phase corresponding to the amplitude command value and the phase command value. The current information acquisition unit 113 acquires information of the secondary side current. For example, the current information acquisition unit 113 obtains a current value of the power lines 12U, 12V, 12W from the current sensor 50.

The first mode control unit 114 is configured to cause the secondary side frequency of the matrix converter circuitry 10 to follow the command frequency. The secondary side frequency means a frequency of the secondary side voltage or the secondary side current. For example, the first mode control unit 114 controls the matrix converter circuitry 10 so that the frequency of the secondary side voltage follows the command frequency. The frequency of the secondary side current follows the frequency of the secondary side voltage. Therefore, causing the frequency of the secondary side voltage to follow the command frequency is synonymous with causing the frequency of the secondary side current to follow the command frequency. Hereinafter, the control by the first mode control unit 114 is referred to as "a first mode control".

The second mode control unit 115 is configured to control the matrix converter circuitry 10 according to the second control mode. For example, the second mode control unit 115 is configure to maintain the primary-secondary phase difference within the predetermined target range. The primary side may comprise the primary side phase and a primary side adjacent phase. An example of combination of the primary side phase and the secondary side phase is a voltage phase of the R phase and a voltage phase of the S phase. Another example of combination of the primary side phase and the secondary side phase is the voltage phase of the S phase and a voltage phase of the T phase. Another example of combination of the primary side phase and the secondary side phase is the voltage phase of the T phase and the voltage phase of the R phase. The second mode control unit 115 may further be configured to maintain the primary-secondary phase difference within the target range and maintain the secondary side phase between the primary side phase and the primary side adjacent phase. In the three phase AC power, an intra-primary phase difference between the primary side phase and the primary side adjacent phase is 120°. For example, the intra-primary phase difference between the R phase and the S phase is 120°, the intra-primary phase difference between the S phase and the T phase is also 120°, and the intra-primary phase difference between the T phase and the R phase is also 120°. In that case, the second mode control unit 115 may further be configured to maintain the primary-secondary phase difference within the target range which is ±30° of an odd multiple of 60°. The odd multiple of 60° may be a positive value or a negative value. Maintaining the primary-secondary phase difference within the target range means maintaining an absolute value of the primary-secondary phase difference within the target range. For example, the second mode control unit 115 may maintain the difference between the secondary side phase and the primary side phase at 45° to 75°, may maintain the difference between the secondary side phase and the primary side phase at 55° to 65°, and may maintain the difference between the secondary side phase and the primary side phase at substantially 60°.

The secondary side phase is a phase of the secondary side voltage or the secondary side current. The primary side phase is a phase of the primary side voltage or the primary side current. The primary side phase may be a phase of the primary side voltage of the matrix converter circuitry 10 (a primary side voltage phase of the matrix converter circuitry 10), and the secondary side phase may be a phase of the primary side current of the matrix converter circuitry 10 (a secondary side current phase of the matrix converter circuitry 10). For example, the second mode control unit 115 may further be configured to control the matrix converter circuitry 10 so as to maintain the primary-secondary phase difference between the secondary side current phase acquired by the current information acquisition unit 113 and the primary side voltage phase calculated by the phase/amplitude calculation unit 111 within ±30° of an odd multiple of 60°. For example, the second mode control unit 115 may further be configured to: calculate a deviation between a target difference predetermined within the target range and the primary-secondary phase difference; calculate a voltage command to reduce the deviation; and cause the secondary side voltage of the matrix converter circuitry 10 to follow the voltage command. Hereinafter, the control by the second mode control unit 115 is referred to as "a second mode control".

The mode switching unit 116 is configured to: select the first control mode in response to determining that the command-primary frequency difference is above the predetermined threshold; and select the second control mode in response to determining that the command-primary frequency difference is below the threshold. The first mode control unit 114 or the second mode control unit 115 controls the matrix converter circuitry 10 in accordance with a selection of the first control mode or the second control mode. For example, the first mode control unit 114 controls the matrix converter circuitry if the mode switching unit 116 selects the first control mode. The second mode control unit 115 controls the matrix converter circuitry if the mode switching unit 116 selects the second control mode. For example, the mode switching unit 116 is configured to switch a control mode of the matrix converter circuitry 10 based on the command-primary difference between the command frequency and the primary side frequency so that control by the first mode control unit 114 is executed when the command-primary difference exceeds the predetermined threshold and control by the second mode control unit 115 is executed when the command-primary difference is below the threshold. For example, the mode switching unit 116 shifts the control by the first mode control unit 114 to the control by the second mode control unit 115 when the difference between the command frequency and the primary side frequency becomes equal to or less than a predetermined first threshold. The mode switching unit 116 may shift control by the second mode control unit 115 to control by the first mode control unit 114 in response to the difference between the command frequency and the primary side frequency exceeding a predetermined second threshold. The primary side frequency means the frequency of the primary side voltage or the primary side current.

For example, the mode switching unit 116 shifts control by the first mode control unit 114 to control by the second mode control unit 115 when the difference between the command frequency and the frequency of the primary side voltage falls below the first threshold, and shifts control by the second mode control unit 115 to control by the first mode control unit 114 when the difference between the command frequency and the frequency of the primary side voltage exceeds the second threshold. The first threshold and the second threshold may be equal or different from each other. For example, the second threshold may be greater than the first threshold.

The frequency of the primary side voltage is substantially equal to the frequency of the primary side current. Therefore, the difference between the command frequency and the frequency of the primary side voltage falling below the first threshold is synonymous with the difference between the command frequency and the frequency of the primary side current falling below the first threshold. That the difference between the command frequency and the frequency of the primary side voltage exceeds the second threshold is synonymous with that the difference between the command frequency and the frequency of the primary side current exceeds the second threshold.

After the mode switching unit 116 shifts the control by the first mode control unit 114 to the control by the second mode control unit 115, the second mode control unit 115 may gradually change the difference between the secondary side phase and the primary side phase from outside the range of the ±30° of an odd multiple of 60° to within the range before maintaining the difference between the secondary side phase and the primary side phase within the ±30° of an odd multiple of 60°.

Figure 3:
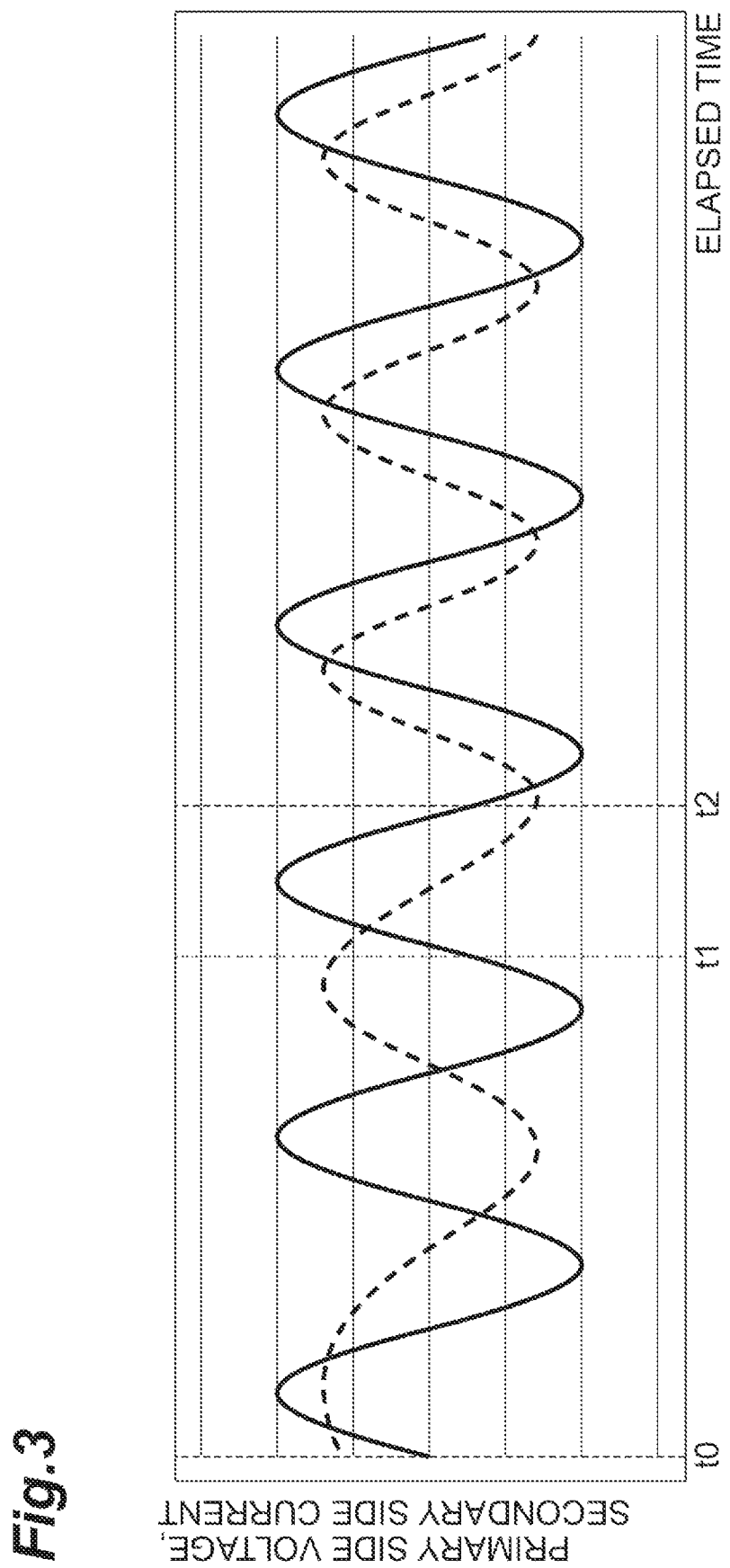
FIG. 3 is a graph illustrating transitions of a primary side voltage and a secondary side current.

FIG. 3 is a graph illustrating transitions of the primary side voltage and the secondary side current before and after the mode switching unit 116 shifts control by the first mode control unit 114 to control by the second mode control unit 115. In this graph, the horizontal axis represents an elapsed time, the vertical axis represents the magnitude of the primary side voltage or the secondary side current, the solid line plot represents the transition of the primary side voltage, and the dashed line plot represents the transition of the secondary side current.

From a time t0 corresponding to the origin of the graph to a time t1, control is performed by the first mode control unit 114. In this control, the command frequency gradually increases, and in the time t1, the difference between the command frequency and the frequency of the primary side voltage falls below the threshold first. The mode switching unit 116 now shifts control by the first mode control unit 114 to control by the second mode control unit 115.

The second mode control unit 115 gradually changes the difference between the phase of the secondary side current and the phase of the primary side voltage up to 60° from the time t1 to a time t2. The second mode control unit 115 then maintains the difference between the phase of the secondary side current and the phase of the primary side voltage at substantially 60°. By keeping the difference between the phase of the secondary side current and the phase of the primary side voltage at 60°, the secondary side frequency becomes equal to the primary side frequency, but a state in which the phase of the secondary side current and the phase of the primary side voltage are aligned is avoided.

The deterioration detection unit 117 is configured to: calculate a deterioration level based on the secondary side current, the carrier frequency, and the primary-secondary frequency difference between a primary side frequency and a secondary side frequency of the matrix converter circuitry; and output a deterioration notification in response to determining that the deterioration level exceeds a predetermined level. For example, the deterioration detection unit 117 evaluates the deterioration level of the switching element based on the information of the primary side voltage calculated by the phase/amplitude calculation unit 111, the command frequency, the information of the secondary side current acquired by the current information acquisition unit 113, and the carrier frequency in the power conversion control unit 112. Hereinafter, configurations of the first mode control unit 114, the second mode control unit 115, and the deterioration detection unit 117 will be described in more detail.

First Mode Control Unit

Figure 4:
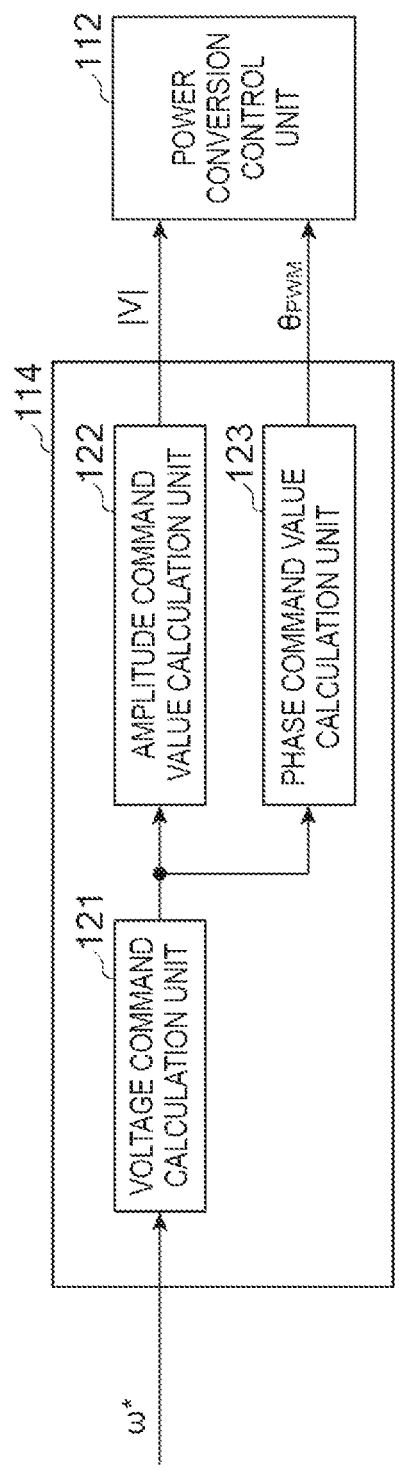
FIG. 4 is a block diagram illustrating an example configuration of a first mode control unit.

When the first mode control is selected by the mode switching unit 116, the first mode control unit 114 acquires the command frequency from the host controller 200 and controls the matrix converter circuitry 10 so that the secondary side frequency follows the command frequency. As an example, as illustrated in FIG. 4, the first mode control unit 114 includes a voltage command generation unit 121, an amplitude command value calculation unit 122, and a phase command value calculation unit 123, and repeats a series of control cycles by these units.

The voltage command generation unit 121 calculates a voltage command for the secondary side voltage based on the command frequency ω*. For example, the voltage command generation unit 121 calculates the voltage command vector in the rotating coordinate system by the V/f method. The rotating coordinate system is a coordinate system that rotates in synchronization with the command frequency. Examples of the rotating coordinate system include a γδ coordinate system in which a γ-axis having a magnetic pole direction of the rotor as a target direction and a δ-axis perpendicular to the y-axis are coordinate axes. The voltage command generation unit 121 may calculate the voltage command vector based on the detected value of the secondary side current, the torque command, and the like.

The amplitude command value calculation unit 122 calculates a command value for oscillation amplitude of the secondary side voltage. Hereinafter, the command value for the oscillation amplitude of the secondary side voltage is referred to as "the amplitude command value".

For example, the amplitude command value calculation unit 122 calculates the magnitude of the voltage command vector as the amplitude command value |V|.

The phase command value calculation unit 123 calculates a command value for the phase of the secondary side voltage. Hereinafter, the command value for the phase of the secondary side voltage is referred to as "the phase command value". For example, the phase command value calculation unit 123 calculates a phase command value $\theta_{PWM}$ based on the angle of rotation of the rotating coordinate system with respect to the fixed coordinate system and the angle of phase of the voltage command vector in the rotating coordinate system.

The amplitude command value calculation unit 122 outputs the amplitude command value to the power conversion control unit 112, and the phase command value calculation unit 123 outputs the phase command value $\theta_{PWM}$ to the power conversion control unit 112. The power conversion control unit 112 controls the matrix converter circuitry 10 to output the secondary side voltage having an oscillation amplitude corresponding to the amplitude command value and a phase corresponding to the phase command value $\theta_{PWM}$.

Second Mode Control Unit

The second mode control unit 115 may further be configured to: generate a target phase of the secondary side voltage phase to maintain the primary-secondary phase voltage phase within the target range; and calculate the deviation based on a comparison between the target phase and the secondary side voltage phase. The second mode control unit 115 may further be configured to: detect a current-voltage phase difference between the secondary side voltage phase and the secondary side current phase; and generate the target phase based on the current-voltage phase difference. The second mode control unit 115 may further be configured to: generate a target phase so that a target-primary phase difference between the target phase and the primary side voltage phase is within the target range; and calculate the deviation based on a comparison between the target phase and the secondary side current phase. For example, when the second control mode is selected by the mode switching unit 116, the second mode control unit 115 may generate a target phase of the secondary side voltage phase to maintain the primary-secondary phase difference within ±30° of an odd multiple of 60°, and control the matrix converter circuitry 10 so as to reduce the deviation between the target phase and the phase of the secondary side voltage. For example, the second mode control unit 115 may further be configured to cause an amplitude of the secondary side voltage (a secondary side voltage amplitude of the matrix converter circuitry 10) to follow an amplitude command value different from an amplitude of the primary side voltage (a primary side voltage amplitude of the matrix converter circuitry 10). The second mode control unit 115 may generate the phase command value based on the deviation and controls the matrix converter circuitry 10 to output the secondary side voltage having the oscillation amplitude corresponding to the amplitude command value and the phase corresponding to the phase command value. The second mode control unit 115 may set the amplitude command value to a value different from the oscillation amplitude of the primary side voltage.

Figure 5:
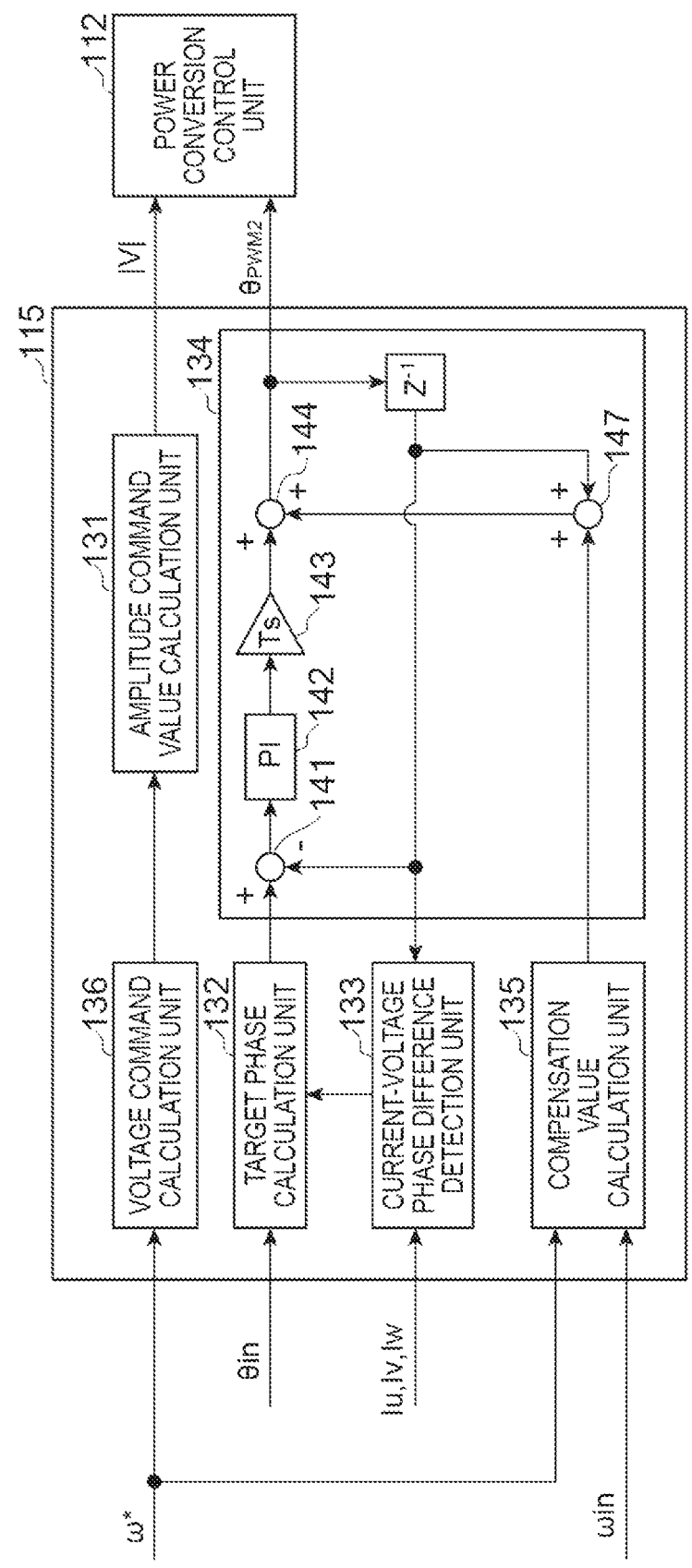
FIG. 5 is a block diagram illustrating an example configuration of a second mode control unit.

As an example, as illustrated in FIG. 5, the second mode control unit 115 includes a voltage command generation unit 136, an amplitude command value calculation unit 131, a current-voltage phase difference detection unit 133, a target phase calculation unit 132, and a phase command value calculation unit 134, and repeats a series of control cycles by these units.

Like the voltage command generation unit 121, the voltage command generation unit 136 calculates the voltage command for the secondary side voltage based on the command frequency ω*. For example, the voltage command generation unit 136 calculates the voltage command vector in the rotating coordinate system by the V/f method. The voltage command generation unit 136 may calculate the voltage command vector based on the detected value of the secondary side current, the torque command, and the like.

The amplitude command value calculation unit 131 calculates the amplitude command value similarly to the amplitude command value calculation unit 122. For example, the amplitude command value calculation unit 131 calculates the magnitude of the voltage command vector as the amplitude command value |V|. The amplitude command value |V| may be different from the oscillation amplitude of the primary side voltage. The current-voltage phase difference detection unit 133 calculates the phase difference of the secondary side voltage with respect to the phase of the secondary side current. Hereinafter, the difference calculated by the current-voltage phase difference detection unit 133 is referred to as "a current-voltage phase difference".

For example, the current-voltage phase difference detection unit 133 acquires the phase command value output to the power conversion control unit 112 in the previous control cycle as information indicating the phase of the secondary side voltage. Hereinafter, the phase command value is referred to as "the phase command value of the previous cycle". Further, the current-voltage phase difference detection unit 133 calculates the phase of the secondary side current based on a current value Iu, Iv, Iw of the power lines 12U, 12V, 12W acquired by the current information acquisition unit 113. Then, the current-voltage phase difference detection unit 133 calculates a current-voltage phase difference based on the phase command value of the previous cycle and the calculated phase of the secondary side current.

The target phase calculation unit 132 generates the target phase of the secondary side voltage so that the difference between the phase of the secondary side current and the phase of the primary side voltage has a value of ±30° of an odd multiple of 60°. For example, the target phase calculation unit 132 calculates a current target phase whose difference from the phase of the primary side voltage is ±30° of an odd multiple of 60°. If the phase of the secondary side current leads the phase of the primary side voltage, the target phase calculation unit 132 may calculate the current target phase by adding ±30° of an odd multiple of 60° to the phase of the primary side voltage. If the phase of the secondary side current is behind the phase of the primary side voltage, the target phase calculation unit 132 may calculate the current target phase by subtracting ±30° of an odd multiple of 60° from the phase of the primary side voltage. The target phase calculation unit 132 generates the target phase of the secondary side voltage based on the current-voltage phase difference calculated by the current-voltage phase difference detection unit 133, and the current target phase. For example, the current-voltage phase difference may be calculated by subtracting the secondary side current phase from the secondary side voltage phase. In that case, the target phase calculation unit 132 may generate the target phase of the secondary side voltage by adding the current-voltage phase difference to the current target phase.

The phase command value calculation unit 134 calculates the phase command value based on a deviation between the target phase and the phase of the secondary side voltage. For example, the phase command value calculation unit 134 calculates a deviation between the target phase and the phase command value of the previous cycle, and calculates the phase command value so as to reduce the deviation. For example, the phase command value calculation unit 134 calculates the deviation between the target phase and the phase command value of the previous cycle, as illustrated in an addition point 141. The phase command value calculation unit 134 performs a proportional-integral operation on the deviation, as indicated by a block 142. Further, the phase command value calculation unit 134 multiplies the result of the proportional-integral operation by a period Ts of one control cycle to calculate a phase change amount, as indicated by a block 143. Further, the phase command value calculation unit 134 calculates a phase command value $\theta_{PWM2}$ by adding the phase change amount to the phase command value of the previous cycle, as illustrated in an addition point 144.

The amplitude command value calculation unit 131 outputs the amplitude command value to the power conversion control unit 112, and the phase command value calculation unit 134 outputs the phase command value $\theta_{PWM2}$ to the power conversion control unit 112. The power conversion control unit 112 controls the matrix converter circuitry 10 to output the secondary side voltage having an oscillation amplitude corresponding to the amplitude command value |V| and a phase corresponding to the phase command value $\theta_{PWM2}$.

As described above, since the current-voltage phase difference detection unit 133 adds the phase change amount to the phase command value of the previous cycle, a delay of one cycle is included in the phase command value $\theta_{PWM2}$, and reduction of the deviation is delayed accordingly. Therefore, the second mode control unit 115 may further be configured to: calculate a delay compensation value based on the primary side frequency; modify the phase command value based on the delay compensation value, so as to compensate for a delay of the deviation reduction; and cause the secondary side voltage phase to follow the modified phase command value. The second mode control unit 115 may further be configured to repeat a control cycle comprising: calculating the deviation; calculating the phase command value based on a previous phase command value calculated in a previous control cycle and the deviation; calculating the delay compensation value based on the primary side frequency; modifying the phase command value based on the delay compensation value; and causing the secondary side voltage phase to follow the modified phase command value. The second mode control unit 115 may further be configured to calculate the delay compensation value based on the deviation and a cycle time of the control cycle. For example, the second mode control unit 115 may calculate the delay compensation value based on the primary side frequency and add the delay compensation value to the phase command value to compensate for the delay of the deviation reduction. The second mode control unit 115 may further be configured to: calculate the delay compensation value according to a weighted average of the command frequency and the primary side frequency; and gradually increase a weight of the primary side frequency in the delay compensation value after a shift from the first control mode to the second control mode. The second mode control unit 115 may further be configured to gradually increase a weight of the command frequency in the delay compensation value before a shift from the second control mode to the first control mode. For example, the second mode control unit 115 further comprises a compensation value calculation unit 135.

The compensation value calculation unit 135 calculates the delay compensation value based on the primary side frequency win. For example, the compensation value calculation unit 135 calculates the delay compensation value by multiplying the primary side frequency win by the period Ts. As illustrated in an addition point 147, the phase command value calculation unit 134 adds the delay compensation value to the phase command value of the previous cycle to calculate a phase estimation value of the current secondary side voltage, and inputs the phase estimation value to the addition point 144. Accordingly, the phase command value $\theta_{PWM2}$ is calculated by adding the phase change amount to the current phase estimation value of the secondary side voltage.

As the command frequency ω* approaches the primary side frequency win as the first mode control shifts to the second mode control, the compensation value calculation unit 135 may calculate the delay compensation value based on a weighted average of the command frequency ω* and the primary side frequency win. For example, the compensation value calculation unit 135 calculates the delay compensation value by multiplying the weighted average by the period Ts. After the mode switching unit 116 shifts the first mode control to the second mode control, the compensation value calculation unit 135 gradually increases the weight of the primary side frequency win in the delay compensation value and gradually decreases the weight of the command frequency ω*. As a result, the secondary side frequency is shifted from the command frequency ω* to the primary side frequency win, the shift from the first mode control to the second mode control becomes smoother, and control in the second mode becomes more stable.

Further, the compensation value calculation unit 135 may gradually increase the weight of the command frequency ω* and gradually decrease the weight of the primary side frequency win in the delay compensation value before the mode switching unit 116 shifts the second mode control to the first mode control. For example, the mode switching unit 116 outputs a shift preparation command to the second mode control unit 115 when the difference between the command frequency and the frequency of the primary side voltage exceeds the second threshold. Correspondingly, the compensation value calculation unit 135 gradually increases the weight of the command frequency ω* in the delay compensation value and gradually decreases the weight of the primary side frequency win. During this period, the second mode control is continued. The second mode control unit 115 outputs a preparation completion notification to the mode switching unit 116 when the weight of the primary side frequency win in the delay compensation value becomes zero. Accordingly, the mode switching unit 116 shifts the second mode control to the first mode control.

The second mode control unit 115 may generate the target phase for the secondary side current instead of the target phase for the secondary side voltage, and control the matrix converter circuitry 10 to reduce the deviation between the target phase and the phase of the secondary side current. For example, the second mode control unit 115 may calculate the phase command value $\theta_{PWM2}$ by calculating a phase change amount by performing a proportional-integral operation or the like on a deviation between the target phase and the phase of the secondary side current, and adding the phase change amount to the phase estimation value of the secondary side voltage.

Deterioration Detection Unit

The deterioration detection unit 117 may be configured to: estimate an average heating value (an average heating level) based on the secondary side current and the carrier frequency; calculate a concentration coefficient based on a primary-secondary frequency difference between the primary side frequency and the secondary side frequency; estimate a local heating level based on the average heating value and the concentration coefficient; calculate the deterioration level based on the local heating level; and notify that the deterioration level exceeds a predetermined level.

Figure 6:
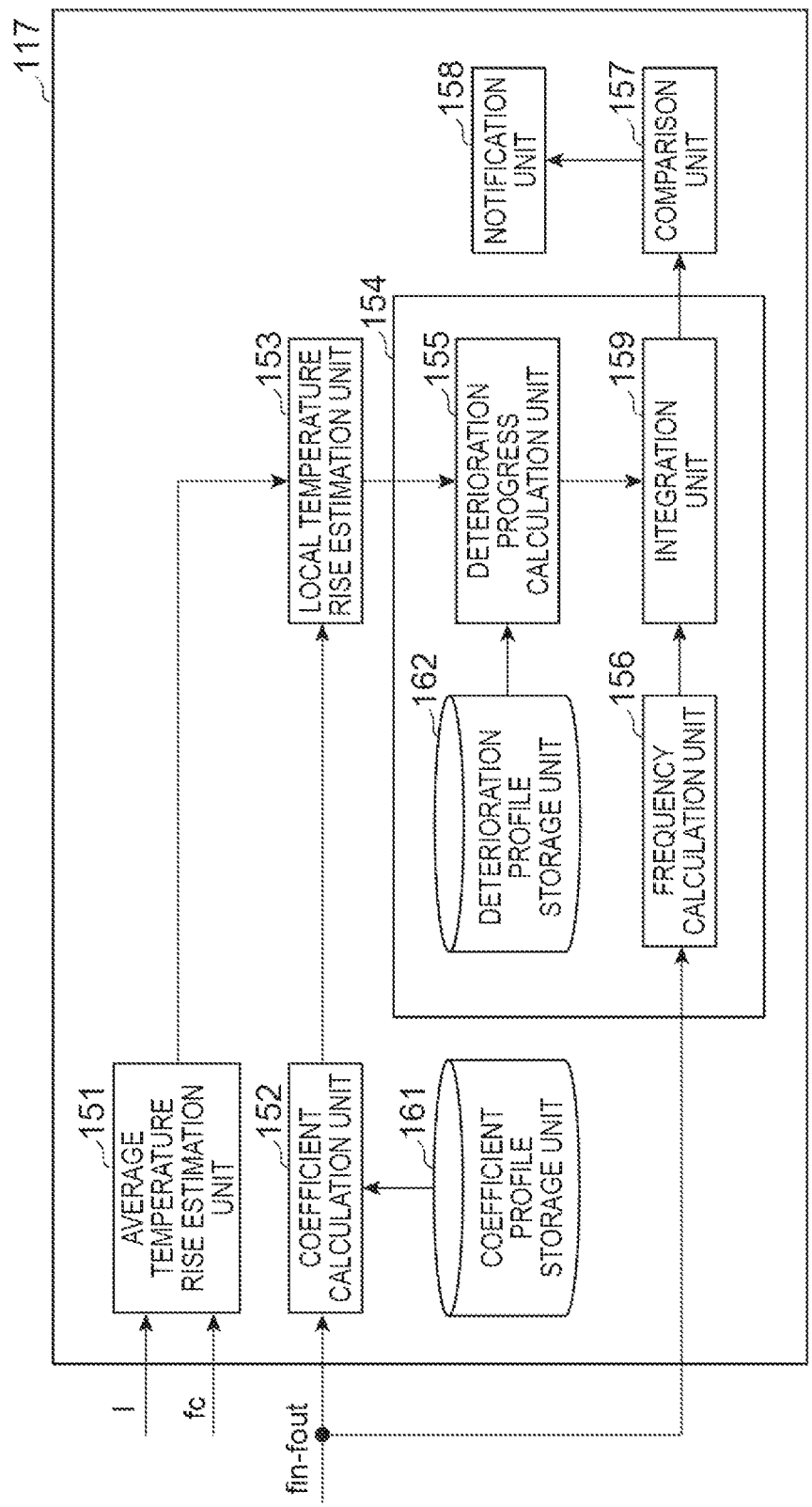
FIG. 6 is a block diagram illustrating an example configuration of a deterioration detection unit.

For example, as illustrated in FIG. 6, the deterioration detection unit 117 includes an average temperature rise estimation unit 151, a coefficient calculation unit 152, a local temperature rise estimation unit 153, a deterioration level calculation unit 154, a comparison unit 157, and a notification unit 158. The average temperature rise estimation unit 151 is configured to estimate the average heating value based on the secondary side current and the carrier frequency. For example, the average temperature rise estimation unit 151 calculates the average heating value based on the following expression.

$$\Delta T = A \cdot I2 + (B + C \cdot fc + D) \cdot I \qquad (1)$$

ΔT: average heating value
I: oscillation amplitude of the secondary side current
fc: carrier frequency
A, B, C, D: coefficients The coefficients A, B, C, and D are obtained in advance by an actual machine test or simulation. The average heating value calculated by Expression (1) includes a steady loss caused by conduction of the secondary side current and the switching loss caused by on/off of the switching element.

The coefficient calculation unit 152 is configured to calculate the concentration coefficient based on the primary-secondary frequency difference. For example, the coefficient calculation unit 152 acquires information on the difference between the primary side frequency and the command frequency from the mode switching unit 116, and calculates the concentration coefficient based on the information. In detail, the coefficient calculation unit 152 increases the concentration coefficient as the absolute difference between the primary side frequency and the command frequency decreases. For example, the deterioration detection unit 117 further comprises a coefficient profile storage unit 161.

The coefficient profile storage unit 161 (a profile storage device) stores a coefficient profile representing the relationship between the absolute value of the primary-secondary phase difference and the concentration coefficient such that the concentration coefficient increases as the absolute value of the primary-secondary frequency difference decreases. The primary-secondary frequency difference may be a difference between the primary side frequency and the command frequency (the command-primary frequency difference). The coefficient profile stored in the coefficient profile storage unit 161 may be a discrete data sequence or a function.

The coefficient calculation unit 152 may further be configured to calculate the concentration coefficient based on the absolute value of the primary-secondary frequency difference and the coefficient profile. For example, the coefficient calculation unit 152 derives the concentration coefficient corresponding to the absolute difference between the primary side frequency and the command frequency in the coefficient profile.

Figure 7:
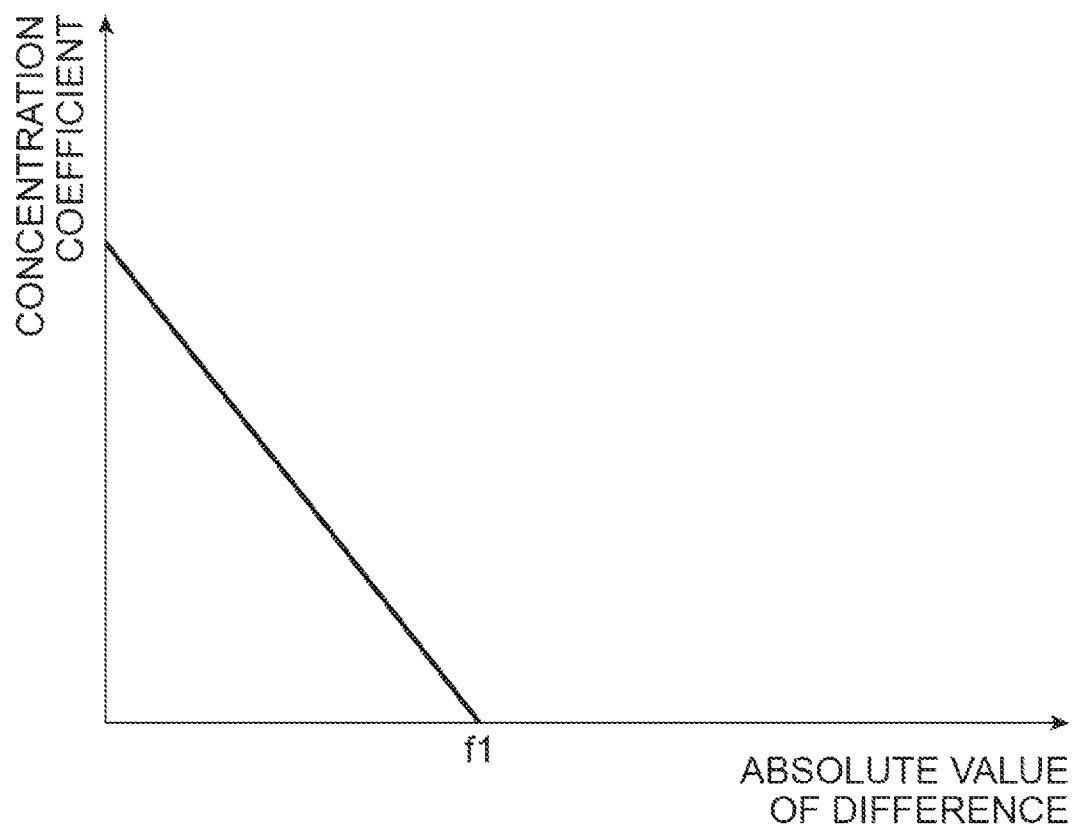
FIG. 7 is a graph illustrating an example coefficient profile.

FIG. 7 is a graph illustrating the coefficient profile, in which the horizontal axis represents the magnitude of the absolute value of the difference and the vertical axis represents the concentration coefficient. The coefficient profile is determined such that the concentration coefficient is zero when the absolute difference value is equal to or greater than the predetermined threshold f1, and the concentration coefficient gradually increases as the absolute difference value decreases when the absolute difference value is less than the threshold f1.

The local temperature rise estimation unit 153 is configured to estimate the local heating level based on the average heating value (the average heating level) and the concentration coefficient. For example, the local temperature rise estimation unit 153 calculates the local heating level by multiplying the average heating value by the concentration coefficient. In the case where the coefficient profile is determined as illustrated in FIG. 7, when the absolute values of the differences are equal to or larger than the threshold f1, the local heating level is set to zero, and the progress of deterioration due to temperature rise is ignored.

The deterioration level calculation unit 154 is configured to calculate the deterioration level of the switching element based on the local heating level. For example, the deterioration level calculation unit 154 may further be configured to: calculate a deterioration progress based on the local heating level; and integrate the deterioration progress to update the deterioration level. The deterioration level calculation unit 154 may calculate the deterioration level by repeatedly calculating the deterioration progress based on the local heating level and integrating the deterioration progress in the control cycle.

One of the causes of the deterioration of the switching element due to the temperature rise is shrinkage of a conductive portion caused by the temperature rise and the temperature fall, and therefore the deterioration level of the switching element is also affected by the frequency of repetition of the temperature rise and the temperature fall. Therefore, the deterioration level calculation unit 154 may further be configured to: calculate a temperature rise frequency based on the primary-secondary frequency difference; and integrate the deterioration progress at the temperature rise frequency to update the deterioration level. For example, the deterioration level calculation unit 154 may be further configured to calculate the deterioration level by repeatedly calculating the deterioration progress based on the local heating level, calculating the temperature rise frequency based on the primary-secondary frequency difference, and integrating a result of multiplying the deterioration progress by the temperature rise frequency. For example, the deterioration level calculation unit 154 includes a deterioration profile storage unit 162, a deterioration progress calculation unit 155, a frequency calculation unit 156, and an integration unit 159, and the deterioration progress is repeatedly integrated by these units.

Figure 8:
FIG. 8 is a graph illustrating an example degradation profile.

The deterioration profile storage unit 162 (deterioration profile storage device) stores a deterioration profile representing a relationship between the local heating level and the deterioration progress. FIG. 8 is a graph illustrating a deterioration profile, wherein the horizontal axis represents the local heating level and the vertical axis represents the deterioration progress. The deterioration profile indicates that the deterioration progress increases as the local heating level increases. For example, the deterioration profile may be defined such that the deterioration progress is zero when the local heating level is equal to or less than a predetermined threshold T1, and the deterioration progress increases as the local heating level increases when the local heating level exceeds the threshold T1. Furthermore, the deterioration profile may be defined such that the deterioration progress is constant when the local heating level is equal to or greater than a threshold T2, which is greater than the threshold T1.

The deterioration progress may be a value obtained by converting the deterioration of the switching element into the number of times of repetition of temperature increase and temperature decrease. Since the lifetime (an allowable deterioration level) of the switching element may be determined by the number of times of repetition of temperature increase/decrease, when the deterioration progress is represented by the number of times of repetition of temperature increase/decrease, a comparison between the deterioration level and the lifetime can be facilitated.

The deterioration progress calculation unit 155 is configured to calculate the deterioration progress based on the local heating level and the deterioration profile. For example, the deterioration progress calculation unit 155 derives the deterioration progress corresponding to the local heating level in the deterioration profile.

The frequency calculation unit 156 calculates the frequency of local temperature rise occurring per unit time (for example, per one second). The temperature of the switching element locally increases during a period in which the phase of the primary side voltage and the phase of the secondary side current are aligned, and gradually decreases as the phase difference between the phase of the primary side voltage and the phase of the secondary side current increases. Therefore, it can be said that the frequency at which the phase of the primary side voltage and the phase of the secondary side current are aligned per unit time is substantially proportional to the frequency of the local temperature rise. Therefore, the frequency calculation unit 156 calculates the difference between the primary side frequency and the secondary side frequency as the frequency of local temperature rise. For example, the frequency calculation unit 156 calculates the absolute difference between the primary side frequency and the command frequency as the frequency of local temperature rise.

The integration unit 159 integrates the deterioration progress calculated by the deterioration progress calculation unit 155 at the frequency calculated by the frequency calculation unit 156. For example, the integration unit 159 multiplies the deterioration progress by the frequency to calculate the deterioration progress per unit time, and further multiplies the deterioration progress by the period Ts of the control cycle to calculate the deterioration progress per one cycle. Then, the deterioration progress per one cycle is added to the deterioration level calculated in the previous control cycle.

The comparison unit 157 compares the deterioration level calculated by the deterioration level calculation unit 154 with the predetermined level. The notification unit 158 notifies that the deterioration level exceeds the predetermined level. For example, the notification unit 158 displays on a display such as a liquid crystal monitor that the deterioration level has exceeded the predetermined level. The notification unit 158 may output a notification signal to the host controller 200 that the deterioration level has exceeded the predetermined level.

As described above, as the difference between the primary side frequency and the secondary side frequency decreases, the time during which the state in which the phase of the primary side voltage is aligned with the phase of the secondary side current continues increases. Therefore, as the difference between the primary side frequency and the secondary side frequency becomes smaller, the local temperature rise value of any of the switching elements of the matrix converter circuitry 10 becomes larger, and the fluctuation width of the temperature due to this also becomes larger. The deterioration detection unit 117 may therefore be configured to evaluate the deterioration level of the switching element in consideration of the temperature fluctuation and to notify the deterioration of the switching element at an appropriate timing.

In the first control mode, the difference between the secondary side phase and the primary side phase of the matrix converter circuitry 10 can be changed without limitation. On the other hand, in the second control mode, the difference between the secondary side phase and the primary side phase is maintained with in the target range. When the mode switching unit 116 shifts the first mode control to the second mode control, a state in which the phase of the primary side voltage and the phase of the secondary side current are aligned is forcibly avoided, and thus the occurrence of local temperature rise is suppressed. Correspondingly, the coefficient calculation unit 152 may further be configured to decrease the concentration coefficient in response to a shift from the first control mode to the second control mode. For example, the coefficient calculation unit 152 may set the concentration coefficient to zero as the first mode control shifts to the second mode control.

The mode switching unit 116 corresponds to a state transition unit configured to shift a state in the matrix converter circuitry from a first state to a second state having a smaller switching loss than the first state in response to the primary-secondary frequency difference falling below a predetermined threshold. Shifting the first control mode to the second control mode is an example of shifting the switching state in the matrix converter circuitry 10 from the first state to the second state having a smaller switching loss than the first state in response to the primary-secondary frequency difference falling below a predetermined threshold. The second state may be a state in which the total loss (power loss) of the switching loss and the steady loss is smaller than that in the first state.

A switching of a connection between the primary side and the secondary side of the matrix converter circuitry 10 in the second state is performed less frequently than in the first state. For example, the first state may be a state in which a switching of a connection between the primary side and the secondary side of the matrix converter circuitry 10 is performed, and the second state may be a state in which the switching of the connection is performed less frequently than in the first state. For example, the second state may be a state in which the carrier frequency is lower than that in the first state. For example, the switching of the connection state is repeatedly performed with a first carrier frequency in the first state, the switching of the connection is repeatedly performed with a second carrier frequency that is smaller than the first carrier frequency, in the second state.

A primary line of the primary side and a secondary line of the secondary side may be repeatedly connected and disconnected in the first state, and an electrical connection between the primary line and the secondary line may be maintained in the second state. For example, the second state may be a state in which the primary side and the second side are directly connected by the matrix converter circuitry 10. For example, the second state may be a state in which the power lines 11R, 11S, 11T (primary line) and the power lines 12U, 12V, 12W (secondary line) are directly connected by the matrix converter circuitry 10.

Hardware Configuration of Control Circuitry

Figure 9:
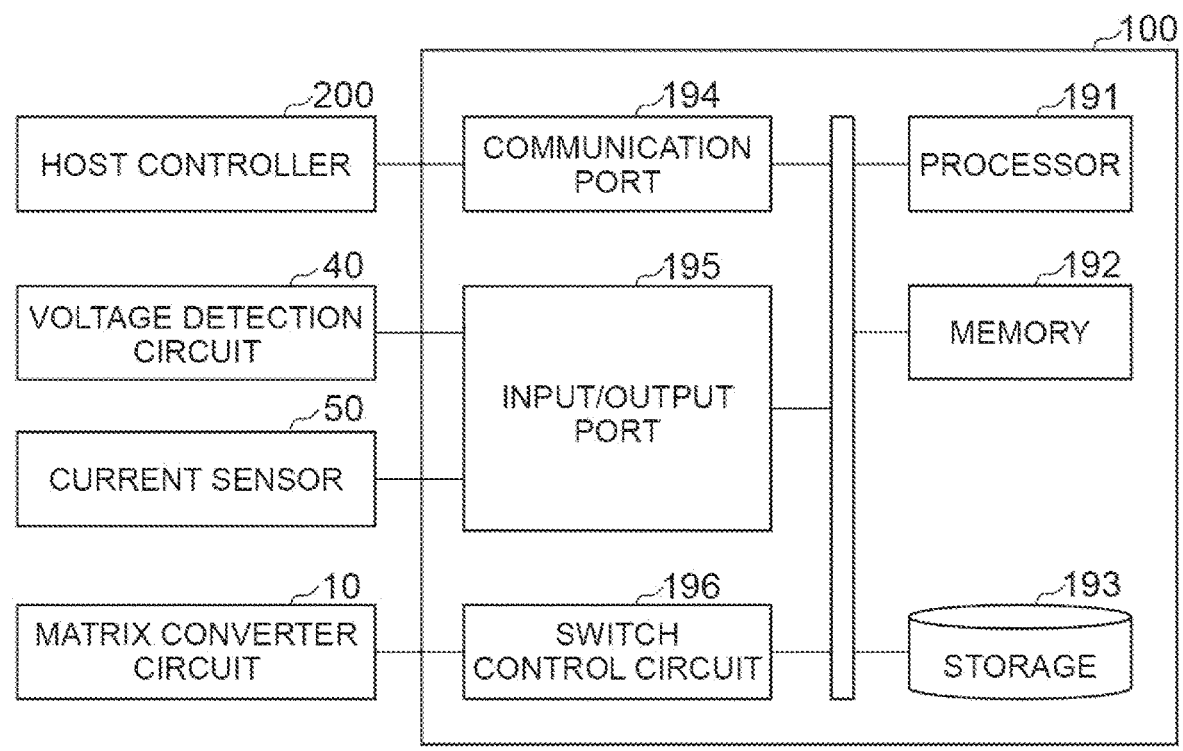
FIG. 9 is a block diagram illustrating an example hardware configuration of control circuitry.

FIG. 9 is a block diagram illustrating a hardware configuration of the control circuitry 100. As illustrated in FIG. 9, the control circuitry 100 includes a processor 191, a memory 192, a storage 193, a communication port 194, an input/output port 195, and a switch control circuitry 196. The processor 191 may include multiple processing devices, the memory 192 may include multiple memory devices, and the storage 193 may include multiple storage devices.

The storage 193 includes a computer-readable storage medium, such as a non-volatile semiconductor memory. The storage 193 stores a program to cause the control circuitry 100 to perform a power conversion method comprising: a first mode control that includes causing a secondary side frequency of a matrix converter circuitry 10 to follow a command frequency by the matrix converter circuitry 10 performing bidirectional power conversion between primary side power and secondary side power; a second mode control that includes maintaining, by the matrix converter circuitry 10, a difference between a secondary side phase and a primary side phase of the matrix converter circuitry 10 within ±30° of an odd multiple of 60°; and a mode switching that includes switching a control mode of the matrix converter circuitry 10 based on a difference between the command frequency and a primary side frequency of the matrix converter circuitry 10 and a predetermined threshold so that control by the first mode control unit 114 is performed if the difference is above the threshold, and control by the second mode control unit 115 is performed if the difference is below the threshold. The storage 193 may store a program to cause the control circuitry 100 to perform a power conversion method including estimating the average heating value (the average heating level) based on the secondary side current of the matrix converter circuitry 10 performing bidirectional power conversion between the primary side power and the secondary side power, calculating the concentration coefficient based on the difference between the primary side frequency and the secondary side frequency of the matrix converter circuitry 10, estimating the local heating level based on the average heating value and the concentration coefficient, calculating the deterioration level based on the local heating level, and notifying that the deterioration level has exceeded the predetermined level. For example, the storage 193 stores a program for configuring each of the functional blocks in the control circuitry 100.

The memory 192 temporarily stores a program loaded from a storage medium of the storage 193 and an operation result by the processor 191. The processor 191 constitutes each functional block of the control circuitry 100 by executing the program in cooperation with the memory 192. The input/output port 195 inputs and outputs an electric signal between the voltage detection circuit 40 and the current sensor 50 in accordance with a command from the processor 191. The communication port 194 performs information communication with the host controller 200 in accordance with a command from the processor 191. The switch control circuitry 196 outputs a drive signal for switching on and off the bidirectional switches 2RU, 2SU, 2TU, 2RV, 2SV, 2TV, 2RW, 2SW, 2TW to the matrix converter circuitry 10 in accordance with a command from the processor 191.

It should be noted that the control circuitry 100 is not necessarily limited to one that configures each function by a program. For example, at least a part of the functions of the control circuitry 100 may be configured by a dedicated logic circuit or an application specific integrated circuit (ASIC) in which the dedicated logic circuit is integrated.

Power Conversion Procedure

Next, a control procedure of the matrix converter circuitry 10 executed by the control circuitry 100 will be described as an example of power conversion methods. The control procedure comprises: a first mode control that includes causing a secondary side frequency of a matrix converter circuitry 10 to follow a command frequency by the matrix converter circuitry 10 performing bidirectional power conversion between primary side power and secondary side power; a second mode control that includes maintaining, by the matrix converter circuitry 10, a difference between a secondary side phase and a primary side phase of the matrix converter circuitry 10 within ±30° of an odd multiple of 60°; and a mode switching that includes switching a control mode of the matrix converter circuitry 10 based on a difference between the command frequency and a primary side frequency of the matrix converter circuitry 10 and a predetermined threshold so that control by the first mode control unit 114 is performed if the difference is above the threshold, and control by the second mode control unit 115 is performed if the difference is below the threshold. The control procedure may further include estimating the average heating level based on the secondary side current of the matrix converter circuitry 10 performing bidirectional power conversion between the primary side power and the secondary side power, calculating the concentration coefficient based on the difference between the primary side frequency and the secondary side frequency of the matrix converter circuitry 10, estimating the local heating value (the local heating level) based on the average heating value and the concentration coefficient, calculating the deterioration level based on the local heating level, and notifying that the deterioration level exceeds the predetermined level.

For example, the control circuitry 100 executes a control mode switching procedure, a first mode control procedure, a second mode control procedure, and a deterioration detection procedure in parallel. Hereinafter, each procedure will be described in detail.

Control Mode Switching Procedure

Figure 10:
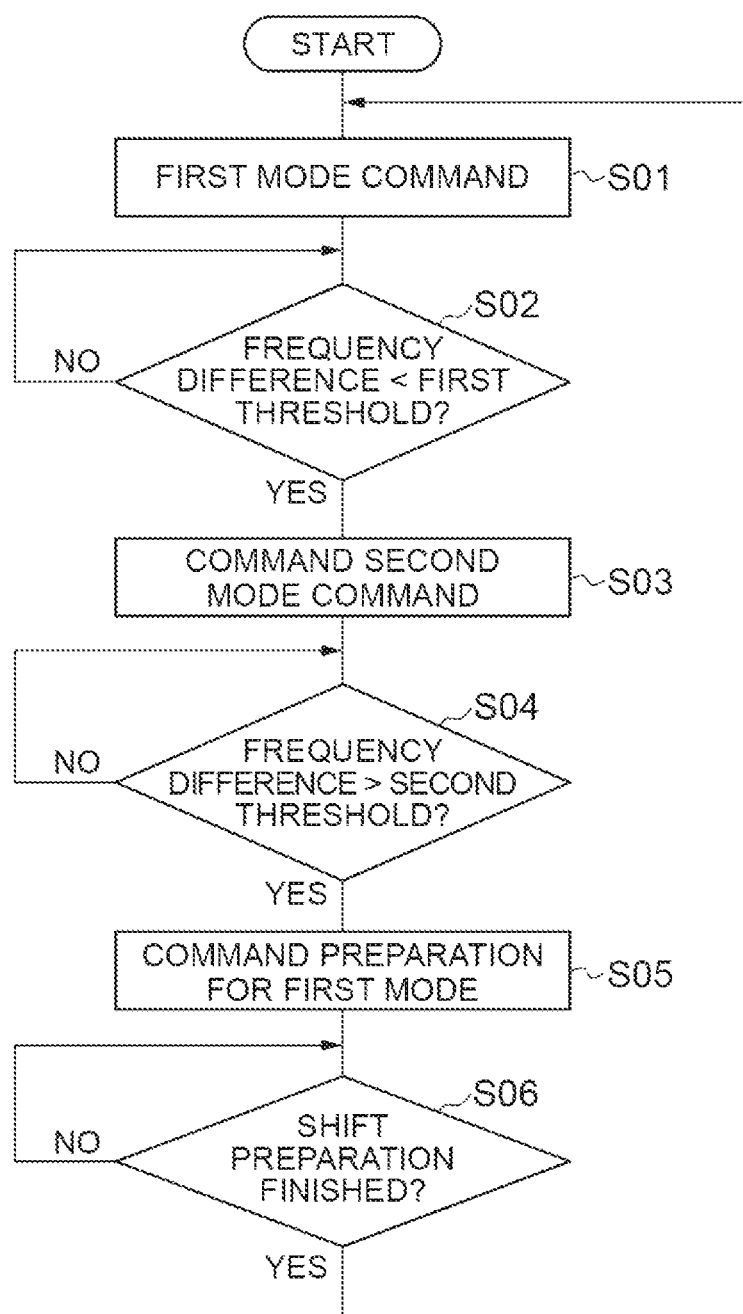
FIG. 10 is a flowchart illustrating an example control mode switching procedure.

As illustrated in FIG. 10, the control circuitry 100 executes operations S01, S02, S03, S04, S05, S06 in sequence. In the operation S01, the mode switching unit 116 outputs a first mode command to the first mode control unit 114. In response, the first mode control unit 114 initiates a first mode control procedure. In the operation S02, the mode switching unit 116 waits for the difference between the command frequency and the primary side frequency to fall below the first threshold. In the operation S03, the mode switching unit 116 outputs a second mode command to the second mode control unit 115. In response, the second mode control unit 115 initiates a second mode control procedure. In the operation S04, the mode switching unit 116 waits for the difference between the command frequency and the primary side frequency to exceed the second threshold.

In the operation 505, the mode switching unit 116 outputs a shift preparation command to the first mode control to the second mode control unit 115. In response, the second mode control unit 115 initiates shift preparation to first mode control as described below. In the operation S06, the mode switching unit 116 waits for completion of the shift preparation by the second mode control unit 115. The control circuitry 100 then returns processing to the operation S01. Thus, the first mode control procedure by the first mode control unit 114 is resumed again. The control circuitry 100 repeats the above procedure.

First Mode Control Procedure

Figure 11:
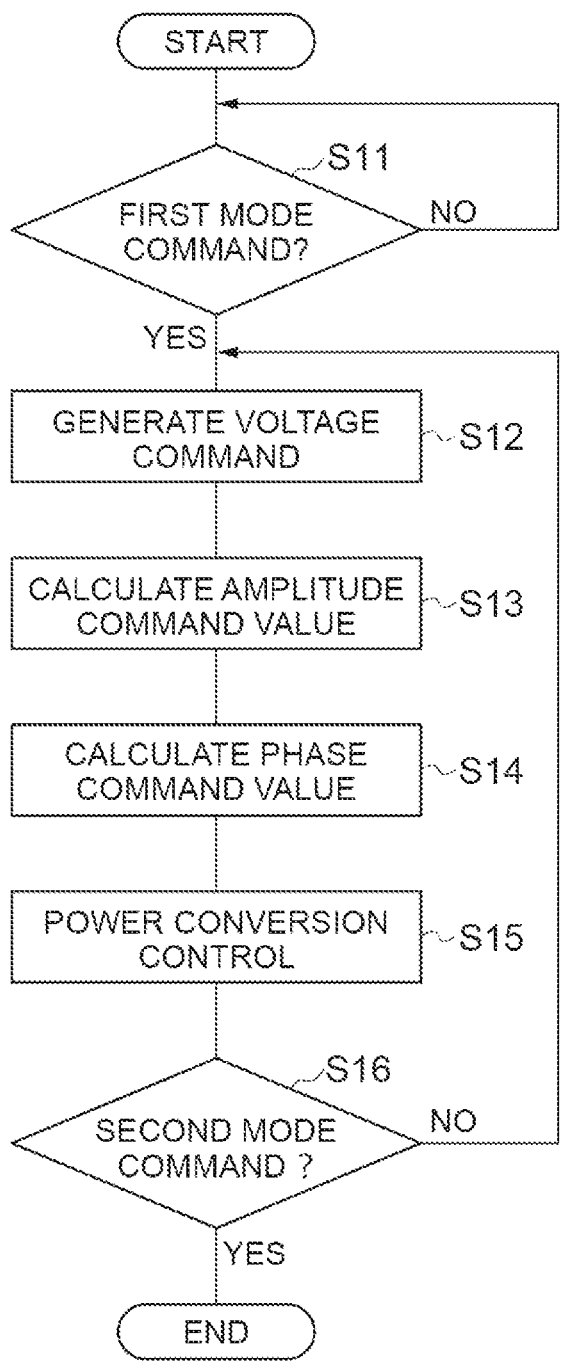
FIG. 11 is a flowchart illustrating a first mode control procedure.

As illustrated in FIG. 11, the control circuitry 100 executes a operation S1*l* to S16 in sequence. In the operation S11, the first mode control unit 114 waits for the output of the first mode command from the mode switching unit 116. In the operation S12, the voltage command generation unit 121 calculates a voltage command vector for the secondary side voltage based on the command frequency ω*. In the operation S13, the amplitude command value calculation unit 122 calculates the magnitude of the voltage command vector as the amplitude command value. In the operation S14, the phase command value calculation unit 123 calculates the phase command value based on the angle of rotation of the rotating coordinate system with respect to the fixed coordinate system and the angle of phase of the voltage command vector in the rotating coordinate system. In the operation S15, the amplitude command value calculation unit 122 outputs the amplitude command value to the power conversion control unit 112, and the phase command value calculation unit 123 outputs the phase command value to the power conversion control unit 112. The power conversion control unit 112 controls the matrix converter circuitry 10 to output the secondary side voltage having an oscillation amplitude corresponding to the oscillation amplitude of the secondary side voltage and a phase corresponding to the phase command value.

In the operation S16, the first mode control unit 114 checks whether or not the second mode command is output from the mode switching unit 116. If it is determined that the second mode command is not output in the operation S16, the control circuitry 100 returns the processing to the operation S12. Thereafter, the first mode control procedure is repeated until the mode switching unit 116 outputs the second mode command. If it is determined that the second mode command is output in the operation S16, the control circuitry 100 completes the first mode control procedure.

Second Mode Control Procedure

Figure 12:
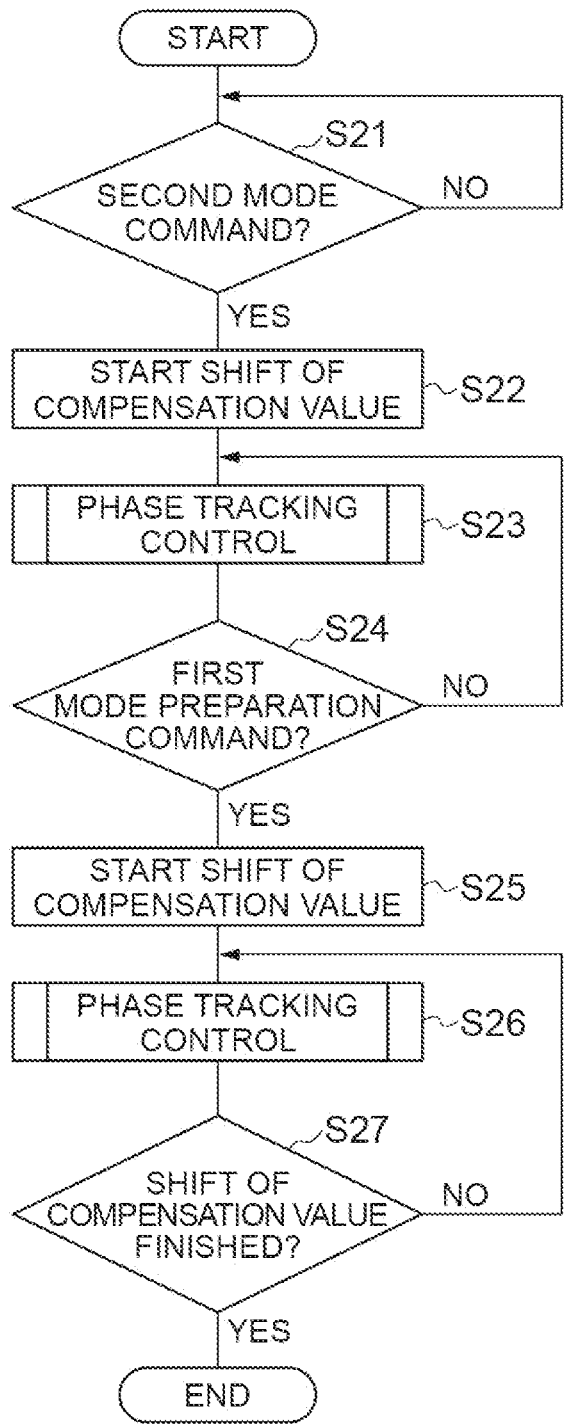
FIG. 12 is a flowchart illustrating a second mode control procedure.

As illustrated in FIG. 12, the control circuitry 100 first executes operations S21, S22, S23, S24. In the operation S21, the second mode control unit 115 waits for the output of the second mode command from the mode switching unit 116. In the operation S22, the compensation value calculation unit 135 starts gradually increasing the weight of the primary side frequency and gradually decreasing the weight of the command frequency in the delay compensation value. In the operation S23, the second mode control unit 115 executes phase tracking control to maintain the difference between the phase of the secondary side current and the phase of the primary side voltage within ±30° of an odd multiple of 60°. Contents of the operation S23 will be described later. In the operation S24, the second mode control unit 115 confirms whether or not the shift preparation command to the first mode control is output from the mode switching unit 116.

If it is determined that the shift preparation command is not output in the operation S24, the control circuitry 100 returns the processing to the operation S23. Thereafter, the phase tracking control is continued until the shift preparation command is output.

If it is determined that the shift preparation command is output in the operation S24, the control circuitry 100 executes operations S25, S26, S27. In the operation S25, the compensation value calculation unit 135 starts gradually increasing the weight of the command frequency in the delay compensation value and gradually decreasing the weight of the primary side frequency. In the operation S26, the second mode control unit 115 executes the phase tracking control. In the operation S27, the second mode control unit 115 checks whether the weight of the primary side frequency in the delay compensation value has reached zero.

If it is determined in the operation S27 that the weight of the primary side frequency in the delay compensation value has not reached zero, the control circuitry 100 returns processing to the operation S26. Thereafter, the phase tracking control is continued until the weight of the primary side frequency in the delay compensation value reaches zero. If it is determined in the operation S27 that the weight of the primary side frequency in the delay compensation value reaches zero, the control circuitry 100 completes the second mode control procedure.

Figure 13:
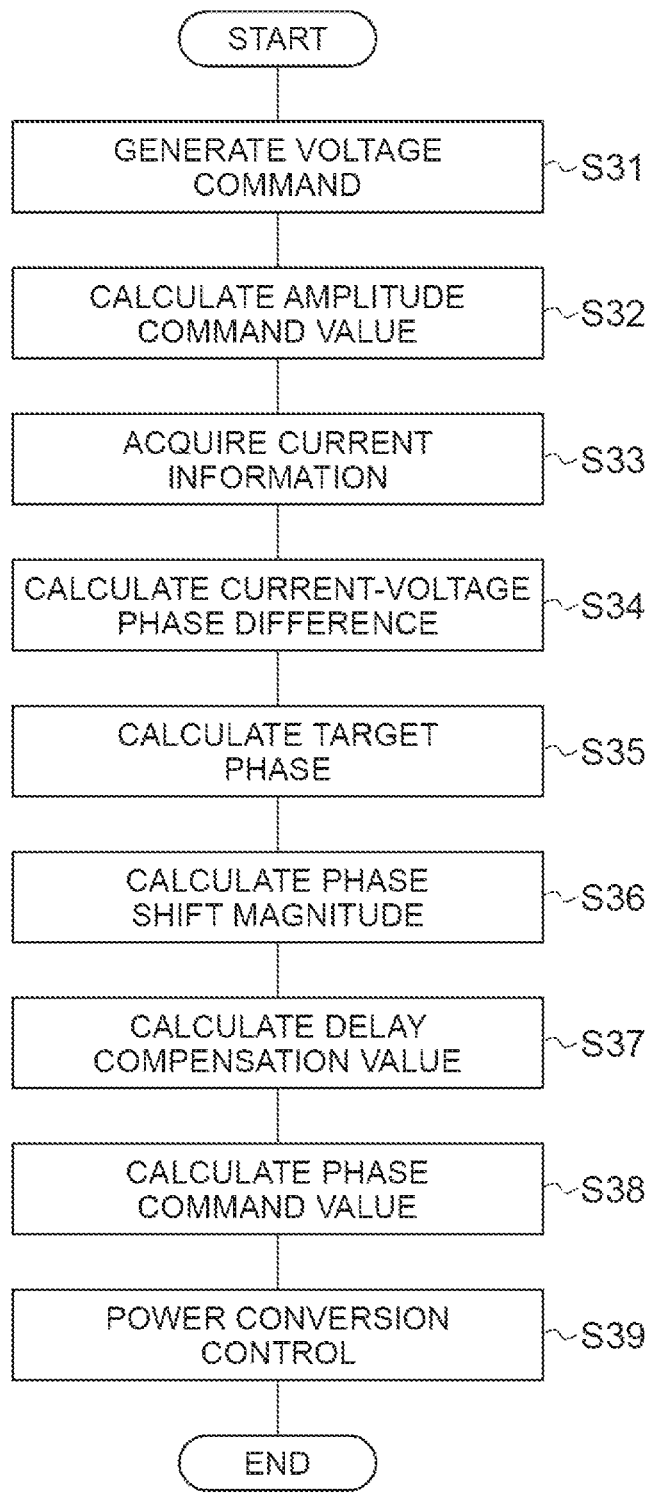
FIG. 13 is a flowchart illustrating an example phase tracking control procedure.

FIG. 13 is a flowchart illustrating a phase tracking control procedure in operations S23, S26. As illustrated in FIG. 13, the control circuitry 100 executes operations S31, S32, S33, S34, S35, S36, S37, S38, S39 in sequence. In the operation S31, the voltage command generation unit 136 calculates a voltage command vector for the secondary side voltage based on the command frequency ω*. In the operation S32, the amplitude command value calculation unit 131 calculates the magnitude of the voltage command vector as the amplitude command value.

In the operation S33, the current information acquisition unit 113 acquires information of the secondary side current. For example, the current information acquisition unit 113 obtains a current value of the power lines 12U, 12V, 12W from the current sensor 50. In the operation S34, the current-voltage phase difference detection unit 133 calculates the phase difference of the secondary side voltage with respect to the phase of the secondary side current (the current-voltage phase difference).

In the operation S35, the target phase calculation unit 132 generates the target phase of the secondary side voltage such that the difference between the phase of the secondary side current and the phase of the primary side voltage is ±30° of an odd multiple of 60°. For example, the target phase calculation unit 132 calculates a current target phase whose difference from the phase of the primary side voltage is ±30° of an odd multiple of 60°, and generates the target phase of the secondary side voltage by adding a current-voltage phase difference to the current target phase. In the operation S36, the phase command value calculation unit 134 calculates a deviation between the target phase and the phase command value of the previous cycle, and calculates the phase change amount for reducing the deviation.

In the operation S37, the compensation value calculation unit 135 calculates the delay compensation value. In the operation S38, the phase command value calculation unit 134 adds the delay compensation value to the phase command value of the previous cycle to calculate a phase estimation value of the current secondary side voltage, and adds the phase change amount to the phase estimation value to calculate the phase command value.

In the operation S39, the amplitude command value calculation unit 131 outputs the amplitude command value to the power conversion control unit 112, and the phase command value calculation unit 134 outputs the phase command value to the power conversion control unit 112. The power conversion control unit 112 controls the matrix converter circuitry 10 to output the secondary side voltage having an oscillation amplitude corresponding to the amplitude command value and a phase corresponding to the phase command value. Thus, the phase follow-up control procedure of one cycle is completed. It should be noted that the execution order of the operations can be variously changed.

Deterioration Detection Procedure

Figure 14:
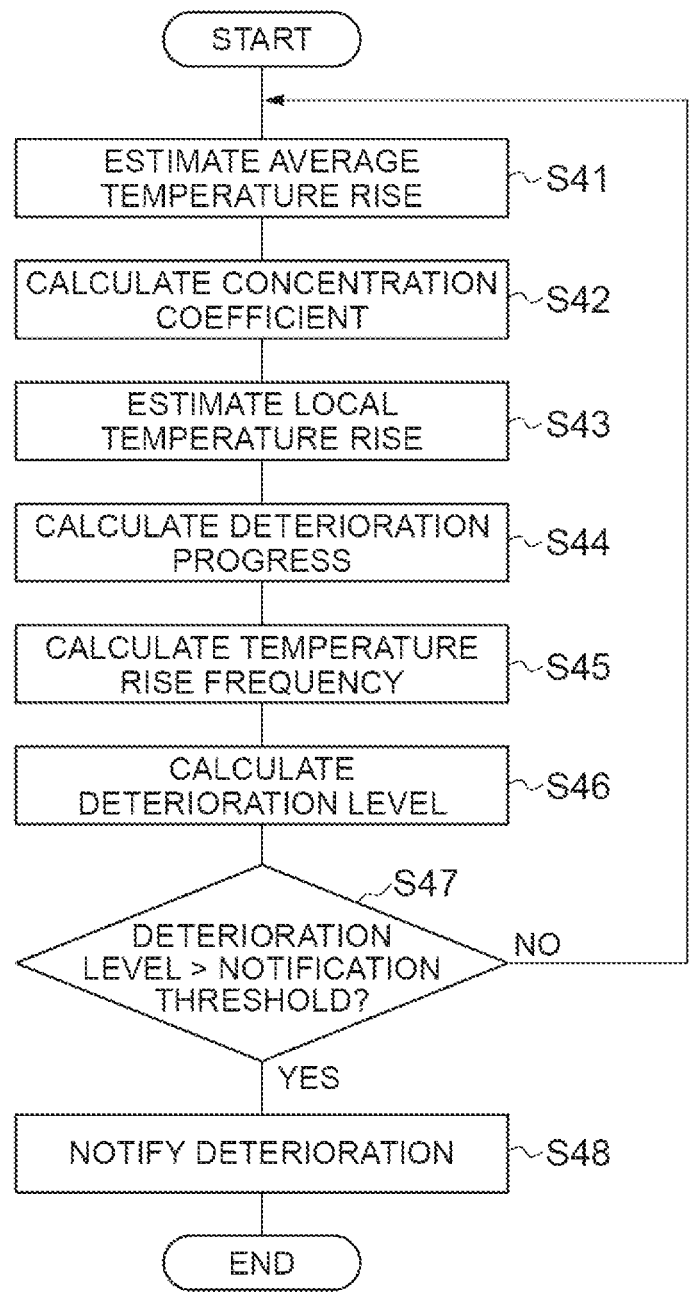
FIG. 14 is a flowchart illustrating an example degradation detection procedure.

As illustrated in FIG. 14, the control circuitry 100 first executes operations S41, S42, S43, S44, S45, S46, S47. In the operation S41, the average temperature rise estimation unit 151 estimates the average heating value based on the secondary side current and the carrier frequency. In the operation S42, the coefficient calculation unit 152 calculates the concentration coefficient based on the difference between the primary side frequency and the secondary side frequency. In the operation S43, the local temperature rise estimation unit 153 estimates the local heating level based on the average heating value and the concentration coefficient. In the operation S44, the deterioration progress calculation unit 155 calculates the deterioration progress based on the local heating level and the deterioration profile.

In the operation S45, the frequency calculation unit 156 calculates the difference between the primary side frequency and the secondary side frequency as the frequency of local temperature rise. In the operation S46, the integration unit 159 calculates the deterioration level by integrating the deterioration progress calculated by the deterioration progress calculation unit 155 with the frequency calculated by the frequency calculation unit 156. In the operation S47, the comparison unit 157 checks whether the deterioration level calculated by the deterioration level calculation unit 154 exceeds the predetermined level.

If the operation S47 determines that the deterioration level does not exceed the predetermined level, the control circuitry 100 returns processing to the operation S41. Thereafter, until the deterioration level exceeds the predetermined level, the calculation of the deterioration progress and the frequency and the integration of the deterioration progress by the calculation result of the frequency are repeated.

If the operation S47 determines that the deterioration level exceeds the predetermined level, the control circuitry 100 executes a operation S48. In the operation S48, the notification unit 158 notifies that the deterioration level exceeds the predetermined level. This completes the deterioration detection procedure.

As described above, the power conversion apparatus 1 may comprise: matrix converter circuitry 10 configured to perform bidirectional power conversion between primary side power and secondary side power; a first mode control unit 114 configured to cause a secondary side frequency of the matrix converter circuitry 10 to follow a command frequency; a second mode control unit 115 configured to maintain the difference between a secondary side phase and a primary side phase of the matrix converter circuitry 10 within ±30° of an odd multiple of 60°; and a mode switching unit 116 configured to switch a control mode of the matrix converter circuitry 10 based on a difference between the command frequency and a primary side frequency of the matrix converter circuitry 10 and a predetermined threshold so that control by the first mode control unit 114 is performed if the difference is above the threshold, and control by the second mode control unit 115 is performed if the difference is below the threshold.

In the matrix converter circuitry, when the state in which the secondary side phase and the primary side phase are aligned is maintained, loss due to the switching is concentrated on any of the switching element of the matrix converter circuitry, and heat generation in the switching element becomes large.

In order to suppress the loss in the state where the secondary side phase and the primary side phase are aligned, the secondary side and the primary side may be directly connected by the matrix converter circuitry, but in the state where the secondary side and the primary side are directly connected, the secondary side oscillation amplitude cannot be controlled.

In contrast, according to the power conversion apparatus 1, the control by the first mode control unit 114 is switched to the control by the second mode control unit 115 as the secondary side frequency approaches the primary side frequency. The second mode control unit 115 maintains the difference between the secondary side phase and the primary side phase within ±30° of an odd multiple of 60° by the matrix converter circuitry 10. As a result, a state in which the secondary side phase and the primary side phase are aligned is avoided, and thus heat generation of the switching element is suppressed. Further, the freedom of control of the secondary side oscillation amplitude is maintained during the control by the second mode control unit 115. Therefore, both the degree of freedom in controlling the secondary side power and the suppression of heat generation of the switching element may be achieved.

The second mode control unit 115 may be further configured to: generate a target phase of a secondary side voltage of the matrix converter circuitry 10 such that a difference between a phase of a secondary side current of the matrix converter circuitry 10 and a phase of a primary side voltage of the matrix converter circuitry 10 is ±30° of an odd multiple of 60°; and control the matrix converter circuitry 10 to reduce a deviation between the target phase and a phase of the secondary side voltage. Accordingly, heat generation in the switching element can be more reliably suppressed. The loss in the switching element is maximized when a phase at which the secondary side current becomes a positive peak value (hereinafter, referred to as "a second side positive peak value") is the positive reference value (the center phases of the first section, the third section, and the fifth section) and minimized when the phase difference between the second side positive peak value and the positive reference value is an odd multiple of 60°. Therefore, when the power factor on the primary side is one (when the positive reference phase coincides with the primary side positive peak phase), the loss in the switching element can be reduced by setting the difference between the phase of the secondary side current and the primary side voltage to ±30° of an odd multiple of 60°. As described above, the power conversion control unit 112 may shift the positive reference phase from the primary side positive peak phase for power factor adjustment of the primary side power. Accordingly, the phase shift range is often limited to a range of more than −30° and less than 30°. Therefore, even in such a case, if the difference between the phase of the secondary side current and the phase of the primary side voltage is ±30° of an odd multiple of 60°, the loss in the switching element is smaller than at least the case where there is no phase difference between the secondary side current and the primary side voltage.

The second mode control unit 115 may be further configured to: generate a target phase so that a difference between the target phase and a phase of a primary side voltage of the matrix converter circuitry 10 is ±30° of an odd multiple of 60°; and control the matrix converter circuitry 10 to reduce a deviation between the target phase and a phase of a secondary side current of the matrix converter circuitry 10. Accordingly, heat generation in the switching element can be more reliably suppressed.

The second mode control unit 115 may be further configured to generate a phase command value based on the deviation and control the matrix converter circuitry 10 to output the secondary side voltage having a phase corresponding to the phase command value. Accordingly, the phase of the secondary side voltage can quickly follow the target phase.

The second mode control unit 115 may be further configured to: calculate a delay compensation value based on the primary side frequency; and add the delay compensation value to the phase command value, so as to compensate for a reduction delay of the deviation. Accordingly, the phase of the secondary side voltage can follow the target phase more quickly.

The second mode control unit 115 may be further configured to: calculate the delay compensation value according to a weighted average of the command frequency and the primary side frequency; and gradually increase a weight of the primary side frequency in the delay compensation value after the mode switching unit 116 shifts control by the first mode control unit 114 to control by the second mode control unit 115. Accordingly, the control by the first mode control unit 114 can be smoothly shifted to the control by the second mode control unit 115.

The second mode control unit 115 may be further configured to gradually increase a weight of the command frequency in the delay compensation value before the mode switching unit 116 shifts control by the second mode control unit 115 to control by the first mode control unit 114. Accordingly, the control by the second mode control unit 115 can be smoothly shifted to the control by the first mode control unit 114.

The second mode control unit 115 may be further configured to control the matrix converter circuitry 10 to output the secondary side voltage having an oscillation amplitude corresponding to an amplitude command value different from an oscillation amplitude of the primary side voltage. Accordingly, the degree of freedom of control may be utilized.

The power conversion apparatus 1 may further comprise: an average temperature rise estimation unit 151 configured to estimate an average heating value (an average heating level) based on the secondary side current and a carrier frequency; a coefficient calculation unit 152 configured to calculate a concentration coefficient based on a difference between the primary side frequency and the command frequency; a local temperature rise estimation unit 153 configured to estimate a local heating level based on the average heating level and the concentration coefficient; a deterioration level calculation unit 154 configured to calculate a deterioration level based on the local heating level; and a notification unit 158 configured to notify that the deterioration level exceeds a predetermined level. Accordingly, the reliability of the matrix converter circuitry 10 can be further improved by a combination of the evaluation of the deterioration level in consideration of the concentration of loss that is likely to occur as the secondary side frequency approaches the primary side frequency and the suppression of the concentration of loss by switching the control mode.

The deterioration level calculation unit 154 may be further configured to calculate the deterioration level by repeatedly calculating a deterioration progress based on the local heating level and integrating a result of multiplying the deterioration progress. Accordingly, the deterioration level may be evaluated.

The deterioration level calculation unit 154 may be further configured to calculate the deterioration level by repeatedly calculating a deterioration progress based on the local heating level, calculating a temperature rise frequency based on a difference between the primary side frequency and the command frequency, and integrating a result of multiplying the deterioration progress by the temperature rise frequency. Accordingly, the deterioration level may be evaluated.

The coefficient calculation unit 152 may be further configured to decrease the concentration coefficient in response to a shift from control by the first mode control unit 114 to control by the second mode control unit 115. Accordingly, overestimation of the deterioration level can be suppressed, and the matrix converter circuitry 10 can be efficiently used.

It is to be understood that not all aspects, advantages and features described herein may necessarily be achieved by, or included in, any one particular example. Indeed, having described and illustrated various examples herein, it should be apparent that other examples may be modified in arrangement and detail.

What is claimed is:

1. A power conversion apparatus, comprising:
matrix converter circuitry configured to perform bidirectional power conversion between a primary side and a secondary side; and
control circuitry configured to:
select a first control mode in response to determining that a command-primary frequency difference between a command frequency and a primary side frequency of the matrix converter circuitry is above a predetermined threshold, wherein the first control mode includes causing a secondary side frequency of the matrix converter circuitry to follow the command frequency;
select a second control mode in response to determining that the command-primary frequency difference is below the threshold, wherein the second control mode includes maintaining a primary-secondary phase difference between a secondary side phase and a primary side phase of the matrix converter circuitry within a predetermined target range; and control the matrix converter circuitry in accordance with a selection of the first control mode or the second control mode.

2. The power conversion apparatus according to claim 1, wherein the primary side comprises the primary side phase and a primary side adjacent phase which is adjacent to the primary side phase, and
wherein the second control mode includes maintaining the primary-secondary phase difference within the target range and maintain the secondary side phase between the primary side phase and the primary side adjacent phase.

3. The power conversion apparatus according to claim 2, wherein an intra-primary phase difference between the primary side phase and the primary side adjacent phase is 120°, and
wherein the second control mode includes maintaining the primary-secondary phase difference within the target range which is ±30° of an odd multiple of 60°.

4. The power conversion apparatus according to claim 2, wherein the second control mode includes causing a secondary side voltage amplitude of the matrix converter circuitry to follow an amplitude command value different from a primary side voltage amplitude of the matrix converter circuitry.

5. The power conversion apparatus according to claim 2, wherein the control circuitry is further configured to:
estimate an average heating level based on a secondary side current of the matrix converter circuitry and a carrier frequency;
calculate a concentration coefficient based on a primary-secondary frequency difference between the primary side frequency and the command frequency;
estimate a local heating level based on the average heating level and the concentration coefficient;
calculate a deterioration level based on the local heating level; and
notify that the deterioration level exceeds a predetermined level.

6. The power conversion apparatus according to claim 5, wherein the control circuitry is further configured to:
calculate a deterioration progress based on the local heating level; and
integrate the deterioration progress to update the deterioration level.

7. The power conversion apparatus according to claim 6, wherein the control circuitry is further configured to:
calculate a temperature rise frequency based on the primary-secondary frequency difference; and
integrate the deterioration progress at the temperature rise frequency to update the deterioration level.

8. The power conversion apparatus according to claim 5, wherein the control circuitry is further configured to decrease the concentration coefficient in response to a shift from the first control mode to the second control mode.

9. The power conversion apparatus according to claim 5, further comprising a profile storage device that stores a coefficient profile representing a relationship between an absolute value of the primary-secondary frequency difference and the concentration coefficient such that the concentration coefficient increases as the absolute value of the primary-secondary frequency difference decreases,
wherein the control circuitry is further configured to calculate the concentration coefficient based on the absolute value of the primary-secondary frequency difference.

10. The power conversion apparatus according to claim 1, wherein the primary side phase is a primary side voltage phase of the matrix converter circuitry,
wherein the secondary side phase is a secondary side current phase of the matrix converter circuitry, and
wherein the second control mode includes:
calculating a deviation between a target difference predetermined within the target range and the primary-secondary phase difference;
calculating a voltage command to reduce the deviation; and
causing a secondary side voltage of the matrix converter circuitry to follow the voltage command.

11. The power conversion apparatus according to claim 10, wherein the second control mode includes:
generating a target phase of a secondary side voltage phase to maintain the primary-secondary phase difference within the target range; and
calculating the deviation based on a comparison between the target phase and the secondary side voltage phase.

12. The power conversion apparatus according to claim 11, wherein the second control mode includes:
detecting a current-voltage phase difference between the secondary side voltage phase and the secondary side current phase; and
generating the target phase based on the current-voltage phase difference.

13. The power conversion apparatus according to claim 10, wherein the second control mode includes:
generating a target phase so that a target-primary phase difference between the target phase and the primary side voltage phase is within the target range; and
calculating the deviation based on a comparison between the target phase and the secondary side current phase.

14. The power conversion apparatus according to claim 10, wherein the second control mode includes:
calculating a delay compensation value based on the primary side frequency;
modifying a phase command value based on the delay compensation value, so as to compensate for a delay in reduction of the deviation; and
causing a secondary side voltage phase to follow the modified phase command value.

15. The power conversion apparatus according to claim 14, wherein the second control mode includes repeating a control cycle comprising:
calculating the deviation;
calculating the phase command value based on a previous phase command value calculated in a previous control cycle and the deviation;
calculating the delay compensation value based on the primary side frequency;
modifying the phase command value based on the delay compensation value; and
causing the secondary side voltage phase to follow the modified phase command value.

16. The power conversion apparatus according to claim 15, wherein the second control mode includes calculating the delay compensation value based on the deviation and a cycle time of the control cycle.

17. The power conversion apparatus according to claim 14, wherein the second control mode includes:
calculating the delay compensation value according to a weighted average of the command frequency and the primary side frequency; and gradually increasing a weight of the primary side frequency in the delay compensation value after a shift from the first control mode to the second control mode.

18. The power conversion apparatus according to claim 17, wherein the second control mode includes gradually increasing a weight of the command frequency in the delay compensation value before a shift from the second control mode to the first control mode.

19. A power conversion method comprising:

selecting a first control mode in response to determining that a command-primary frequency difference between a command frequency and a primary side frequency of matrix converter circuitry is above a predetermined threshold, wherein the first control mode includes causing a secondary side frequency of the matrix converter circuitry to follow the command frequency;

selecting a second control mode in response to determining that the command-primary frequency difference is below the threshold, wherein the second control mode includes maintaining a primary-secondary phase difference between a secondary side phase and a primary side phase of the matrix converter circuitry within a predetermined target range; and controlling the matrix converter circuitry in accordance with a selection of the first control mode or the second control mode.

20. A non-transitory memory device having instructions stored thereon that, in response to execution by a processing device, cause the processing device to perform operations comprising:

selecting a first control mode in response to determining that a command-primary frequency difference between a command frequency and a primary side frequency of matrix converter circuitry is above a predetermined threshold, wherein the first control mode includes causing a secondary side frequency of the matrix converter circuitry to follow the command frequency;

selecting a second control mode in response to determining that the command-primary frequency difference is below the threshold, wherein the second control mode includes maintaining a primary-secondary phase difference between a secondary side phase and a primary side phase of the matrix converter circuitry within a predetermined target range; and controlling the matrix converter circuitry in accordance with a selection of the first control mode or the second control mode.

* * * * *